United States Patent [19]
Pierce et al.

[11] Patent Number: 5,921,532
[45] Date of Patent: Jul. 13, 1999

[54] AIR SPRING WITH INTERNAL SUPPORT MEMBER

[75] Inventors: William C. Pierce, Muskegon; John Michael Douglass, Norton Shores; Gregory T. Galazin, Montague; Daniel G. Greenzweig; William J. Hicks, both of Muskegon; Gregory A. Richardson, Holton, all of Mich.

[73] Assignee: Neway Anchorlok International, Inc., Muskegon, Mich.

[21] Appl. No.: 08/817,321

[22] PCT Filed: Oct. 7, 1994

[86] PCT No.: PCT/US94/11447
  § 371 Date: Apr. 7, 1997
  § 102(e) Date: Apr. 7, 1997

[87] PCT Pub. No.: WO96/11120
  PCT Pub. Date: Apr. 18, 1996

[51] Int. Cl.[6] .............................. B60G 17/005; F16F 9/04
[52] U.S. Cl. .................................. 267/64.19; 280/DIG. 1; 267/64.27
[58] Field of Search .............................. 267/64.16, 64.19, 267/64.21, 64.23; 280/DIG. 1; 92/13.1, 13.2, 13.4, 13.6

[56] References Cited

U.S. PATENT DOCUMENTS

| | | |
|---|---|---|
| 1,130,656 | 3/1915 | Annable . |
| 3,049,362 | 8/1962 | Chambers ............................ 267/64.19 |
| 3,074,709 | 1/1963 | Ballard et al. ........................ 267/64.21 |
| 3,077,952 | 2/1963 | Neises . |
| 4,375,903 | 3/1983 | Lovell . |
| 4,787,606 | 11/1988 | Geno et al. .......................... 267/64.27 |
| 5,201,500 | 4/1993 | Ecktman et al. ..................... 267/64.27 |
| 5,382,006 | 1/1995 | Arnold ................................. 267/64.27 |
| 5,413,316 | 5/1995 | Easter .................................. 267/64.24 |

FOREIGN PATENT DOCUMENTS

| | | |
|---|---|---|
| 0 378 949 | 7/1990 | European Pat. Off. . |
| 0 512 550 | 11/1992 | European Pat. Off. . |
| 0 570 315 | 11/1993 | European Pat. Off. . |
| 1221142 | 5/1960 | France . |
| 1265799 | 5/1961 | France . |
| 1780264 | 3/1972 | Germany . |
| 2723305 | 7/1978 | Germany . |
| 1210465 | 10/1968 | United Kingdom . |

*Primary Examiner*—Chris Schwartz
*Attorney, Agent, or Firm*—Rader, Fishman, Grauer & Mc Garry

[57] ABSTRACT

An anti-creep device for use with an air spring of a tractor-trailer is shown. The anti-creep device includes a support member which is mounted inside the air spring for movement between a blocking position and an articulating position. In the articulating position, the full range of compression between the top plate and piston of the air spring can be exercised. In the blocking position, the support member limits the downward movement of the top plate relative to the piston. Therefore, the support member limits downward movement of the frame rail of the trailer with respect to the axle and trailing arm. The support member can comprise a pivotable plate, a bladder filled with an incompressible fluid, a vertically telescoping arm or upper and lower bumpers rotatable into and out of vertical alignment.

24 Claims, 14 Drawing Sheets und 5,921,532

AIR SPRING WITH INTERNAL SUPPORT MEMBER

FIELD OF THE INVENTION

This invention relates to air springs used in trailer suspensions, and more specifically to an improved air spring design in which an internal support member is selectively movable to retard movement of the ends of the air springs toward each other and thus limit suspension travel which will reduce trailer creep relative to a loading dock.

DESCRIPTION OF THE RELATED ART

In the loading of a trailer, the trailer is typically backed up against a dock by the tractor. The operator then lowers the front dolly legs on the trailer until they touch the ground and removes the tractor. In storage situations the tractor may or may not be connected to the trailer. Many trailers have trailing arm suspensions with air springs to control the relative position of the frame with respect to an axle and also to cushion the relative movement of the axle toward the frame due to bumps in the road. Although the air spring is pressurized by the tractor's air compressor during transport and stationary times, the air compressor is normally off during loading operation.

As the trailer is loaded, the force from the weight of the goods loaded into the trailer and the loading equipment, such as a forklift or a handcar, lowers the rear portion of the frame rail with respect to the axle. Because the compressor is off during the loading operation, the air pressure in the air spring is not adjusted to compensate for the increased load. While the rear portion of the trailer frame moves downwardly, the front portion of the trailer frame is substantially fixed at the height of the dolly and the trailer frame effectively rotates about the contact point of the dolly with the ground. The downward movement of the rear portion of the trailer frame results in the rotational movement of the pivotal connection between the trailer frame and the trailing arm. This pivotable movement results in the slight rotation of the trailing arm and wheel to move the trailer forward away from the dock In other words, the trailer tends to move away from the loading dock. This movement is referred to as "creep." Creeping of the trailer can create hazards for loading of the trailers.

U.S. Pat. No. 5,333,645, issued Aug. 2, 1994, discloses an apparatus for overcoming this problem by providing a dump valve to exhaust air from the air spring when the trailer door is opened. The trailer thus bottoms out on the suspension before loading begins and cannot creep away from the dock. Whereas this system has worked well to prevent creep, not all vehicles are equipped with this system, or cannot use such a system. Also, the door switch sometimes malfunctions and the dump valve does not always exhaust air from the air spring.

Therefore, there is a significant need to reduce or eliminate the creeping associated with a trailer during loading. Any solution must be simple, reliable and inexpensive if it is to be commercially viable. Further, the anti-creep solution must also not interfere with the normal function of the trailing arm suspension during its normal operation.

SUMMARY OF INVENTION

The invention relates to an air spring assembly comprising a top plate adapted for mounting to a vehicle frame, a piston adapted for mounting to a suspension, and a substantially hollow air bag mounted between the top plate and piston. During normal operation, the air bag is pressurized and the piston and top plate move toward and away from each other in response to forces acting on the suspension and vehicle frame. According to the invention, a support member is mounted inside the air bag for selective movement between first and second positions. In the first position, movement of the piston relative to the top plate is unrestricted in normal operation of the air spring. In the second position, the movement of the piston relative to the top plate toward each other is restricted. An actuator for moving the support member between the first and second positions is mounted to the support member and one of the top plate and piston.

In one embodiment, the support member comprises a plate pivotally mounted to the top plate and the actuator comprises an air spring which pivots the support member relative to the top plate in response to the fluid pressure applied to the air spring.

In another embodiment, the support member comprises a bumper member mounted to one of the piston and top plate and having at least one locking aperture formed in the side thereof. At least one locking member is mounted to the top plate inside the air spring for lateral movement into and out of the locking aperture of the bumper member. The locking member is removed from the locking aperture in the first position such that the movement of the piston relative to the top plate is unrestricted in normal operation of the air spring. The locking member is received in the locking aperture in the second position such that the movement of the piston relative to the top plate is restricted.

In yet another embodiment, the support member comprises an upstanding bumper member having a proximal end and a distal end, the proximal end being mounted to the piston. A telescoping member having a proximal end and a distal end is mounted at the proximal end to the top plate. A telescoping member is adapted to telescopically receive the upstanding bumper member in response to movement of the top plate and piston toward each other. At least one radially extending locking member is mounted to one of the upstanding bumper member and telescoping member for movement between a retracted position and an extended position. The at least one locking member is received between the distal ends of the upstanding bumper member and the telescoping member in the extended position to restrict movement of the top plate and piston toward one another.

In still another embodiment, the support member comprises a telescoping cylinder mounted to the top plate wherein the telescoping cylinder has threads formed on an interface surface thereof The support member further comprises at least one telescoping bumper member having threads formed on another interface surface thereof wherein the threads of the telescoping cylinder and the at least one telescoping bumper cooperate for selective extension or retraction of the telescoping bumper member with respect to the telescoping cylinder in response to relative rotation between the two. In this embodiment, the actuator comprises a motor mounted to the at least one telescoping bumper to selectively rotate the at least one telescoping bumper relative to the telescoping cylinder for extension or retraction thereof.

In still another embodiment, the support member comprises an upstanding bumper member having a proximal end and a distal end, the proximal end being mounted to the piston. A fluid cylinder is mounted to the top plate such that the fluid cylinder is interconnected to a suitable source of pressurized fluid. The fluid cylinder has a reciprocatable fluid cylinder piston rod. The piston rod has a locking aperture formed along the length thereof A radially extending locking member is mounted to the top plate for movement between a retracted and an extended position. In the extended position, the locking member is selectively received in the locking aperture to restrict movement of the fluid cylinder piston rod relative to the top plate.

In yet another embodiment, the support member comprises an inflatable inner fluid spring disposed inside the substantially hollow air bag. The inner fluid spring is selectively placed in an extended or a retracted position.

BRIEF DESCRIPTION OF THE DRAWINGS

The invention will now be described with reference to the drawings in which.

DESCRIPTION OF THE PREFERRED EMBODIMENTS

Figure 1:
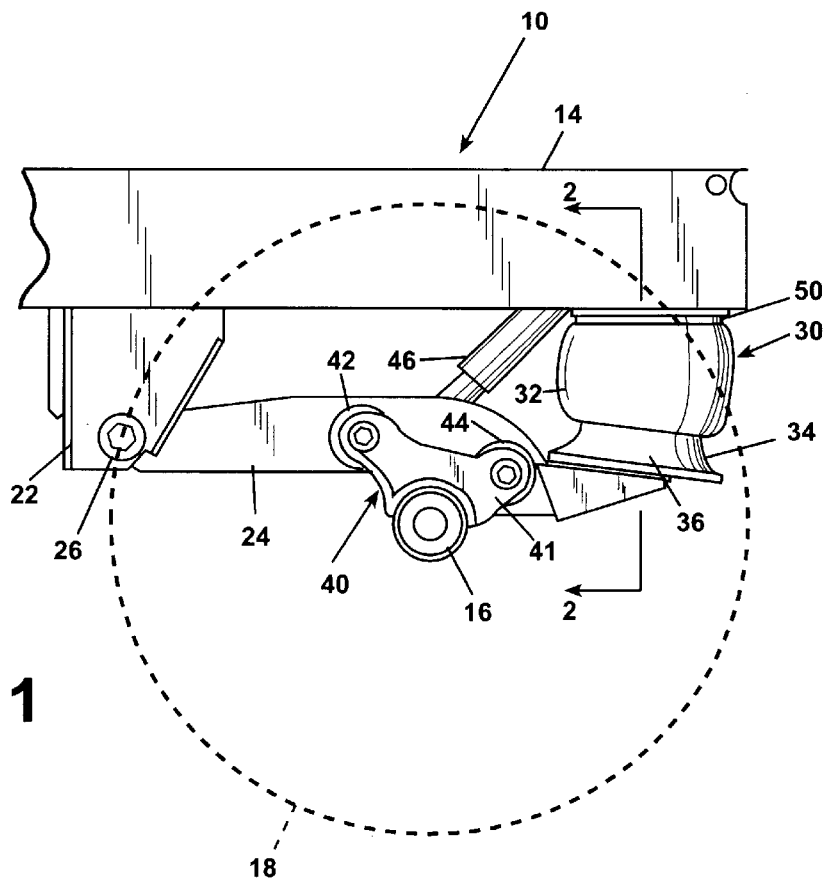
FIG. 1 is a side view of a trailing arm suspension incorporating an air spring having a support member according to the invention.

FIG. 1 illustrates a trailing arm suspension assembly 10 mounted to a longitudinal frame rail 14 of a trailer frame. It supports an axle 16 having wheels 18 mounted on opposite ends thereof. In a typical trailer application, separate trailing arm suspension assemblies 10 mount on opposite lateral sides of the trailer frame to support the opposing ends of the axle 16.

Each trailing arm suspension assembly 10 comprises a hanger bracket 22 fixedly mounted to the frame rail 14. A bushed connection 26 at the forward end of a trailing arm 24 rotatably mounts the trailing arm 24 to the hanger bracket 22. An air spring 30 extends between the trailing arm 24 and the frame rail 14 to resiliently resist upward movement of the trailing arm 24 with respect to the frame. The air spring 30 comprises an air bag or sleeve 32 mounted to a top plate 50 which is mounted to the frame rail 14 and a piston 34 which is mounted to a platform 36 on the trailing end of the trailing arm 24. As the trailing arm 24 rotates, it urges the piston 34 into the air bag 32. The pressure of the air within the air spring 30 resiliently retards movement of the trailing arm 24 toward the frame rail 14.

The air spring entirely contains the anti-creep device, which provides several advantages. The location at the air spring requires the device to thus absorb fewer stresses. Self-containment with the air spring permits the device to be incorporated in replacement air spring assemblies for retrofit to existing trailers. A significant portion of the mechanism is inside the air spring and protected from the environment, i.e., water, dirt, road salt, etc.

An axle mounting bracket 40 mounts the axle 16 to the trailing arm 24. It has opposing plates 41 connected to the trailing arm 24 through two bushed connections 42 and 44. A shock absorber 46 can be mounted between the frame rail 14 and the axle bracket 40 to dampen the movement of the trailing arm 24 with respect to the frame. While the several embodiments of the support member according to the invention described below are shown with a particular axle bracket and shock absorber structure, it is to be understood that the support member according to the invention can be incorporated into any trailing arm suspension.

Figure 2:
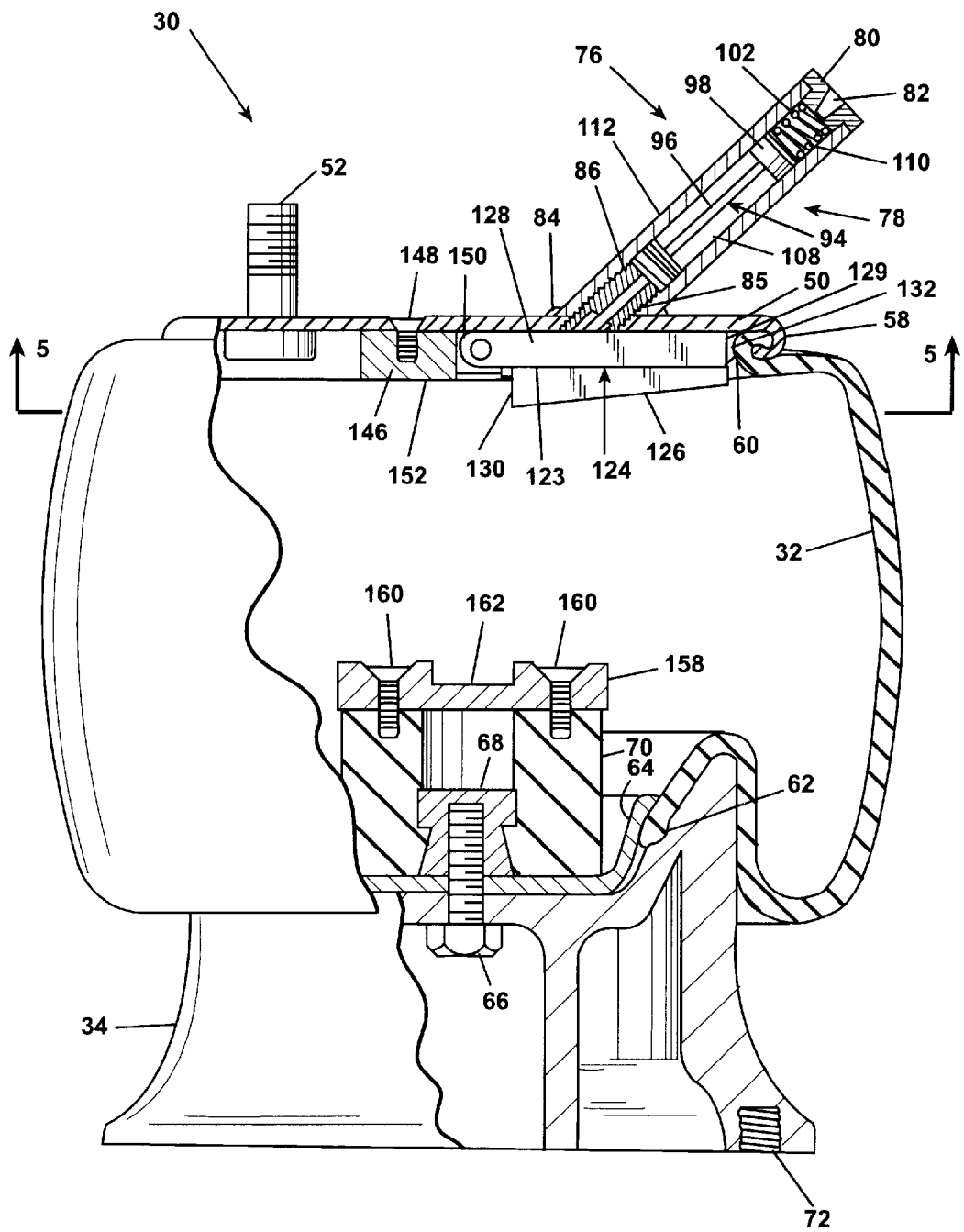
FIG. 2 is a cross-sectional view of the air spring of FIG. 1 taken along the lines 2—2 of FIG. 1 and showing a first embodiment of the support member in a retracted position.

As seen in FIG. 2, the air spring 30 comprises the top plate 50 having at least one stud 52 extending therethrough. The stud 52 is received in a suitable aperture (not shown) in the frame rail 14. A nut (not shown) is threaded onto the stud for securely mounting the top of the air spring 30 to the frame rail 14. Although only one stud 52 is shown in the drawings, multiple studs can be incorporated as desired. The stud 52 has a coaxial bore 56 (FIG. 3) formed therethrough for passing pressurized air from a suitable source (not shown) into the air spring 30.

The outer perimeter of the top plate 50 securely mounts to an upper edge of the air bag 32. In this embodiment, the outer edge 58 of the top plate is rolled to receive a beaded top edge 60 of the air bag 32. A lower mounting plate 64 is bonded to and clamps a lower edge 62 of the air bag 32 against the piston 34. A bolt 66 extends through the piston 34, through the lower mounting plate 64 and threadably receives a nut 68. Cooperation of the bolt 66 and nut 68, thus draws the lower mounting plate 64 against the lower edge 62 of the air bag 32.

The nut 68 also holds a resilient bumper 70, of a type well known in the art, against the piston 34. In case of a sudden loss of air pressure or a large excursion of the piston 34, the bumper 70 prevents the piston 34 from striking the top plate 50. Preferably, the bumper 70 comprises an elastomeric or plastic material and can mount to the piston base 34 in any conventional fashion.

A plurality of threaded apertures 72 formed on the bottom surface of the piston 34 receive conventional threaded fasteners for mounting the piston 34 to the platform 36 of the trailing arm 24.

The foregoing description of the air spring 30 is common to all embodiments of the invention and is a well known air spring construction as more fully described in the Ecktman, et al. U.S. Pat. No. 5,201,500, issued Apr. 13, 1993, and incorporated herein by reference.

The first embodiment of the anti-creep device 76 according to the invention is shown in FIGS. 2–5 and comprises a pneumatic cylinder assembly 77 which is attached to the top plate 50. An end cap 80 is threadably mounted to one end of a tubular cylinder 78. An air outlet 82 is formed in the end cap 80 and creates a fluid conduit between a portion of the interior of the cylinder 78 and the external environment.

The other end of the cylinder 78 communicates with a cylinder aperture 85 formed in the top plate 50, and is mounted to the top plate 50 by various methods such as a weld bead 84 which extends around the perimeter of the end of the base of the cylinder 78. In this embodiment, the cylinder 78 extends upwardly at an acute angle from the plane of the top plate 50. The interior surface of the cylinder 78 adjacent the cylinder aperture 85 is internally threaded such that a seal member 86 is threadably mounted therein. The seal member 86 is preferably formed from a rigid plastic material and comprises threads formed on the external surface to engage cooperating threads formed on the internal surface of the cylinder 78. The seal member 86 further comprises an axial bore 88 formed therein and a pair of fluid seals 90, 92 which cooperate with the seal member 86, piston shaft 96 and interior surface of the cylinder 78 to provide an effective seal. The seal prevents gas or fluid from passing between the interior of the air spring 30 and the first pressure chamber 108 of the cylinder 78.

A piston 94 is slidably mounted inside the body of the cylinder 78. The piston 94 comprises a piston shaft 96 having a piston head 98 mounted to one end thereof. A fluid seal 100 is mounted in an annular groove formed in the outside perimeter of the piston head 98. A compression spring 102 is captured between the end cap 80 and the piston head 98. The second end of the piston shaft 96 extends through the axial bore 88 of the seal member 86 into the body of the air spring 30. The first O-ring 90 of the seal member is received in a groove in the outer perimeter of the seal member to create an air-tight seal between the interior wall of the cylinder 78 and the seal member 86. The second fluid seal 92 of the seal member 86 is received in an annular groove formed in the axial bore 88 of the seal member 86. The second fluid seal 92 creates a substantially air-tight seal between the seal member 86 and the piston shaft 96.

The piston head 98 and fluid seal 100 cooperate with the internal surface of the cylinder 78 to divide the interior of the air cylinder into a first pressure chamber 108 and a second pressure chamber 110. A pressurized fluid aperture 112 is formed in the side wall of the first pressure chamber 108 of the cylinder 78. Pressurized fluid, such as air, is selectively introduced or bled from the first pressure chamber 108 through the pressurized fluid aperture 112. A readily available commercial pneumatic cylinder may be used in place of cylinder assembly 77. This commercial cylinder would be mounted to the top plate 50 and perform the same function as assembly 77.

The second end of the piston shaft 96 extends through the cylinder opening 85 in the top plate 50 into the substantially hollow interior of the air spring 30. The second end of the shaft 96 is pivotally mounted to a guide member 118 by a pivot pin 120. The guide member 118 is slidably received in a guide channel 122 formed on a rear surface 123 of a base plate 125 of a support member 124. The guide channel 122 is shaped in cross section to retain the glide member except along the glide path and extends through a substantial portion of the body of the support member 124, preferably T-shaped.

The support member 124 comprises the base plate 125 and a pair of opposed side plates 126, 127. The base plate 125 has a top portion 128 and a bottom wall 129. Similarly, the side plates 126, 127 have a top wall 130, 131 and a bottom wall 132, 133, respectively. The side plates 126, 127 are mounted to the base plate 125 to create a substantially U-shaped support member 124. The bottom walls 129, 132, 133 of the base and side plates 125, 126, 127, respectively, are coplanar. However, the top walls of the side plates 130, 131 are spaced a short distance from the top of the base plate 125.

Figure 3:
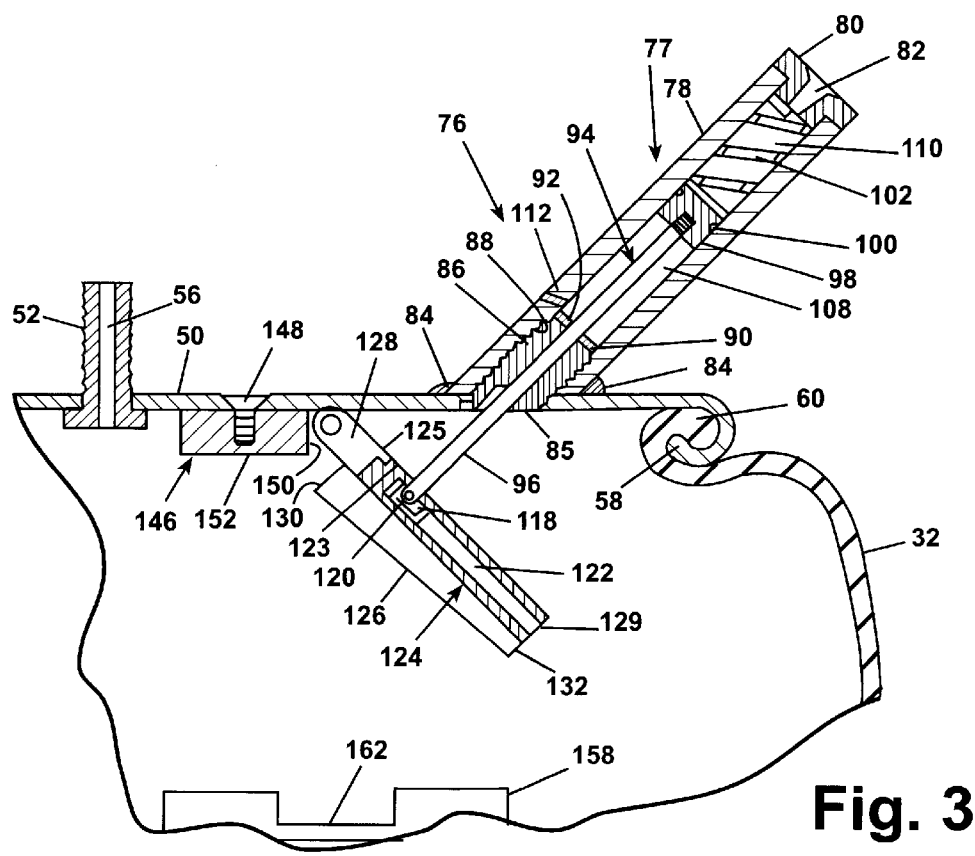
FIG. 3 is a cross-sectional view, like FIG. 2, showing the support member in an intermediate position.

The support member 124 is pivotally mounted to the top plate 50 by bolts, pins or studs 134, 135 which are received or mounted to the opposed sides of the top portion 28 of the base plate 125. The shafts of the bolts, pins or studs 134, 135 are rotatably received in a pair of bearing guide blocks or straps 136, 137 mounted to the underside of the top plate 50. The bearing guide blocks or straps have apertures formed therein to rotatably receive the shafts of the bolts, pins or studs 134, 135. With this pivoting mounting structure, the support member 124 is mounted for movement between a retracted position as seen in FIG. 2, an intermediate position as seen in FIG. 3 and an extended position as seen in FIG. 4.

Figure 4:
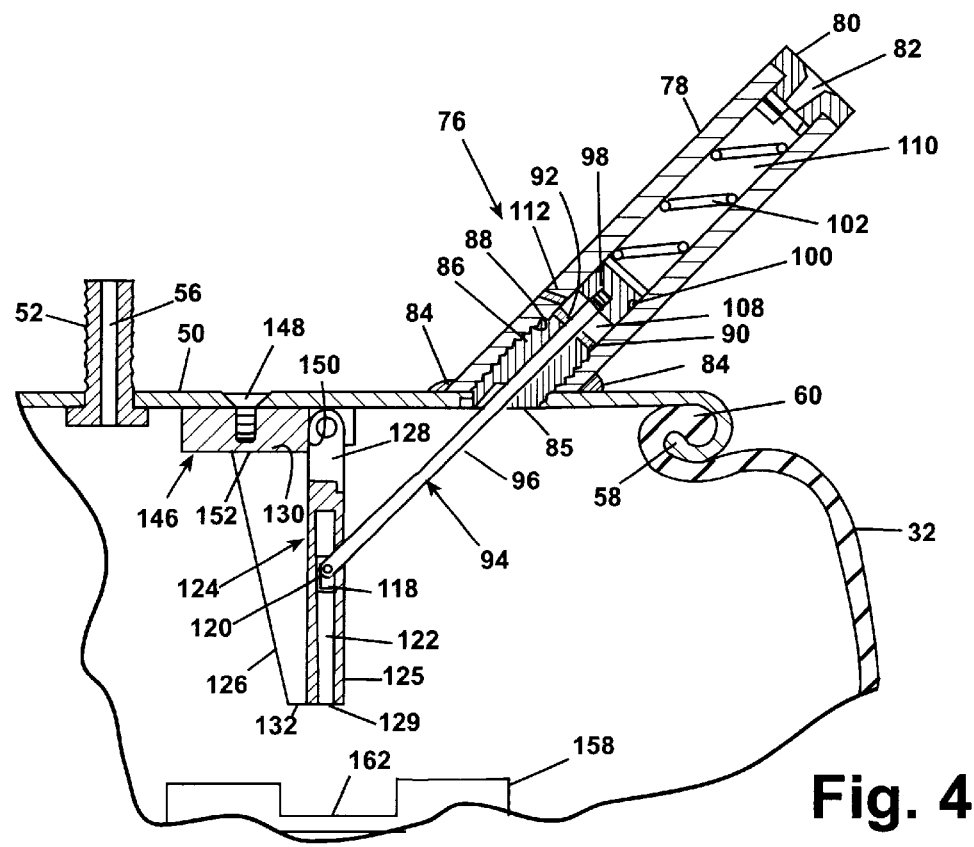
FIG. 4 is a cross-sectional view, like FIG. 2, showing the support member in an extended position.
Figure 5:
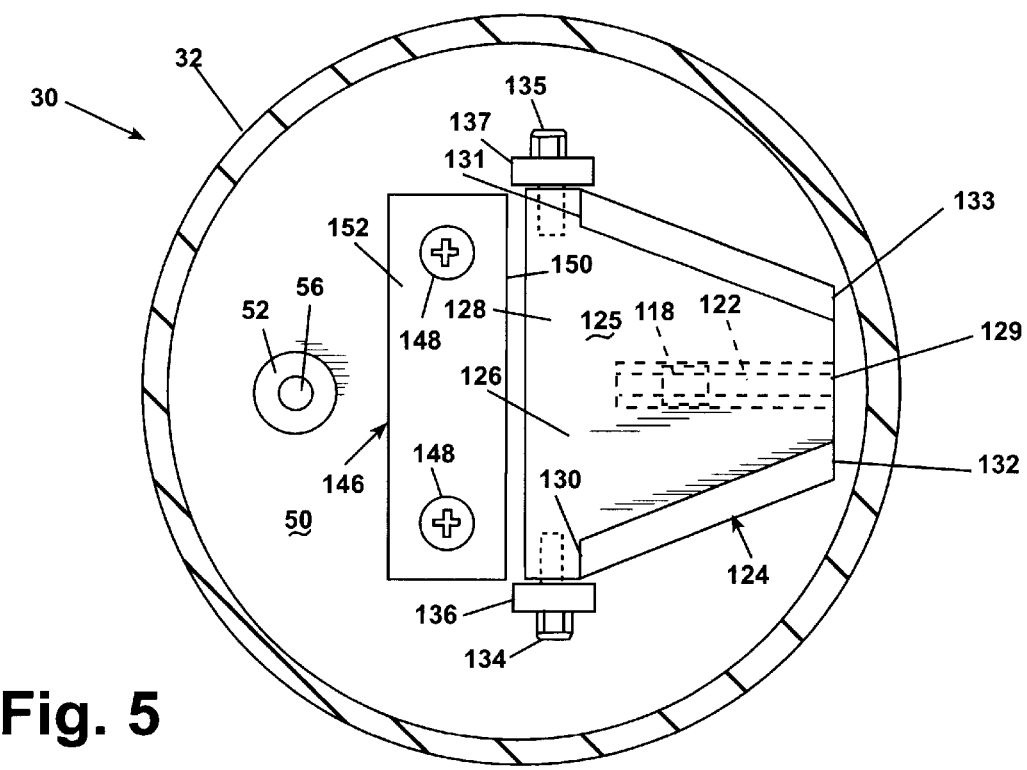
FIG. 5 is a cross-sectional view taken along the lines 5—5 of FIG. 2 and showing a bottom view of the support member in the retracted position.

The support member moves from the retracted to the extended position in response to movement of the piston shaft 96 from a retracted position as seen in FIG. 2 to an extended position as seen in FIG. 4. As the piston shaft 96 is forced out of the air spring cylinder 78 from the retracted to extended positions, the guide member 118 slides in the T-shaped channel 122 and the support member 124 pivots about the axis of the bolts 134, 135. The pivotable mounting between the second end of the piston shaft 96 and the guide member 118 and the sliding mounting of the guide member 118 in the guide channel 122 of the support member accommodates the extension of the piston shaft 96 as the support member 124 pivots between the retracted and extended positions.

A stop plate 146 is mounted by fasteners 148 to the underside of the top plate 50 adjacent the top portion of the support member 124. The stop plate 146 is mounted to the top plate 50 such that a side wall 150 of the stop plate will abut the front surface 123 of the base plate 125 when the support member 124 is pivoted to the extended position. Similarly, the top walls 130, 131 of the side plates 126, 127 abut the bottom wall 152 of the stop plate 146 when the support member 124 is pivoted to the extended position The abutting engagement between the stop plate 146 and support member 124 prevents over-rotation or extension of the support member 124 beyond a substantially vertical orientation in the extended position A bumper plate 158 is mounted to the top surface of the bumper 70 by a plurality of conventional fasteners 160. Other mounting options include mechanical fasteners which would grip the inner or outer diameter of the bumper 70. In one option, the bumper plate 158 has a support channel 162 formed in the top surface extending from one side to the other of the bumper plate 158. The bumper plate 158 is formed of a durable, strong material such as steel.

In operation, the anti-creep device 76 limits movement of the axle 16 and trailing arm 24 with respect to the frame rail 14 under certain pressure conditions inside the air spring 30 and air cylinder assembly 77. The air spring 30 dampens articulation of the trailing arm 24 and axle 16 relative to the frame rail 14 during normal operation of a tractor-trailer. The air spring 30 receives pressurized air from a conventional air compressor. Similarly, the first pressure chamber 108 of the pneumatic cylinder assembly 77 receives pressurized air from a conventional emergency air-brake pressure system. The pressurized air inside the first pressure chamber 108 is sufficient to overcome the bias of the compression spring 102 when the emergency air brake is pressurized, thereby disengaging the brakes. Under these conditions, the piston 94 and support member 124 are held in the retracted position, as seen in FIG. 2. When the emergency brake system loses pressure, such as when the trailer is disconnected from the tractor, the source of pressurized air to the first pressure cylinder 108 of the pneumatic cylinder assembly 77 terminates. Without the pressurized air to overcome the bias of the compression spring 102, the spring 102 will force the piston 94 from the retracted position as seen in FIG. 2 to the intermediate position of FIG. 3 ultimately to the extended position as seen in FIG. 4.

In the extended position, the support member 124 will limit the amount of downward movement of the frame rail 14 relative to the axle 16 and trailing arm 24. For example, when the trailer is backed up to a loading dock and the emergency air brake system is depressurized to set the brake, the engagement of the bottom walls of the support member 124 are received in the support channel 162 of the bumper plate 158 and will limit the amount of downward movement of the frame rail 14 relative to the axle 16 and tires 18. Therefore, as goods are loaded into the trailer and loading equipment such as hand carts or trucks are received in the trailer, the height of the floor of the trailer cannot move downward relative to the axle more than the spacing between the bottom end of the support member 124 and the bumper plate 158.

It is often critically important to prevent downward movement of the floor of the trailer which is mounted to the frame rail during loading and unloading of the trailer. When an empty trailer is parked at a loading dock, the floor of the trailer is typically aligned with the surface of the loading dock Therefore, the loading equipment can easily roll into and out of the trailer from the loading dock. As goods are loaded into the trailer, the trailer will have a tendency to creep or sink downward relative to the loading dock because there is no source of pressurized air to keep the air springs inflated to a particular level. When this occurs, the trailer floor and loading dock become misaligned, thereby making it difficult to continue loading of the trailer through the use of loading equipment. Therefore, as the relative load conditions inside the trailer change, it is important to maintain the height of the trailer floor and frame rail relative to the axle and loading dock.

Figure 6:
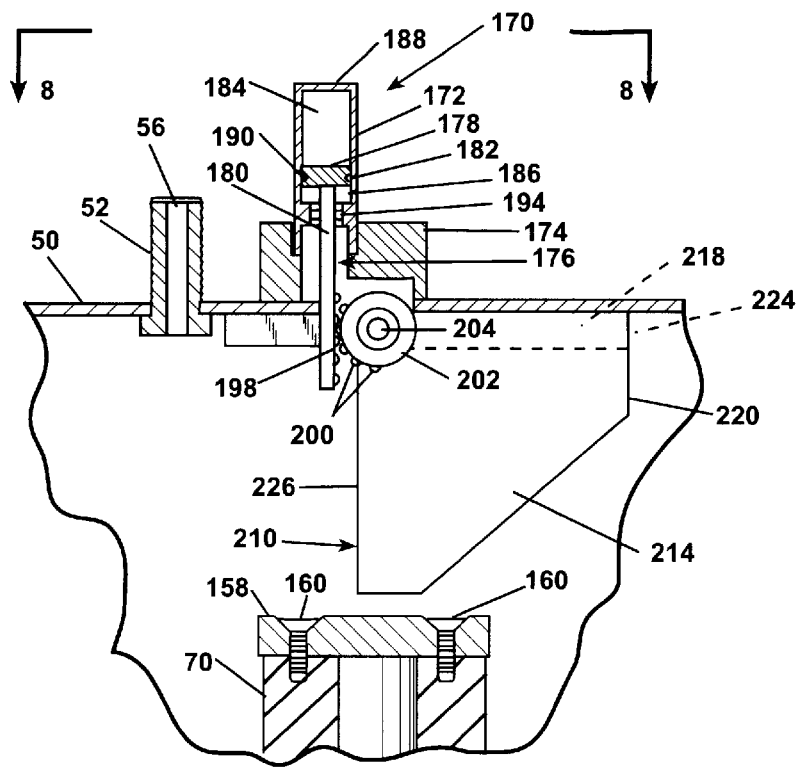
FIG. 6 is a partial cross-sectional view, like FIG. 2, showing a further embodiment of a support member according to the invention with the support member shown in a retracted position.
Figure 7:
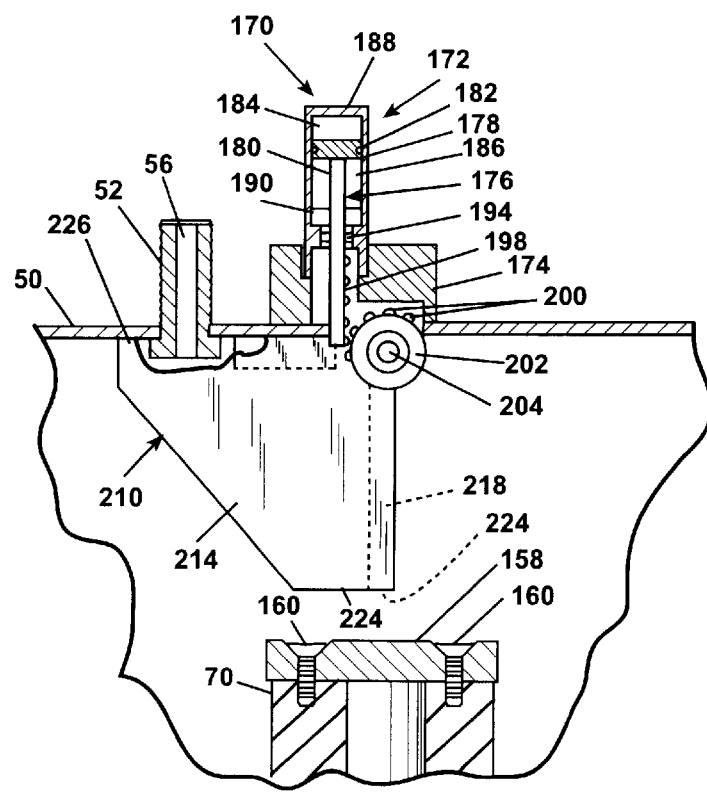
FIG. 7 is a cross-sectional view of the embodiment shown in FIG. 6, showing the support member in an extended position.
Figure 8:
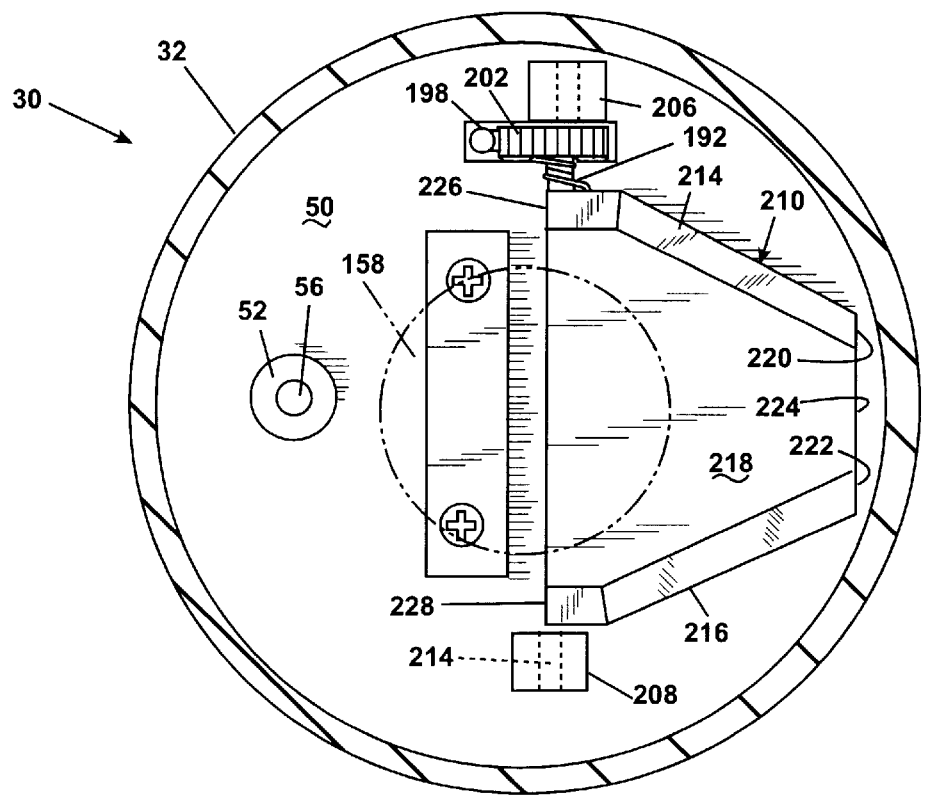
FIG. 8 is a cross-sectional view taken along lines 8—8 of FIG. 6 and showing the support member in the retracted position.

A second embodiment of the anti-creep device is seen in FIGS. 6–8. In this embodiment, a fluid cylinder assembly 170 is mounted to a support block 174 which is in turn mounted to the top plate 50. A piston 176 is slidably mounted inside a tubular cylinder 172 for movement between an extended position as seen in FIG. 7 and a retracted position as seen in FIG. 6. The piston 176 comprises a piston head 178 mounted to a first end of a piston shaft 180. The piston head 178 has a fluid seal 182 mounted in an annular groove formed on the outside perimeter of the piston head 178. The fluid seal 182 cooperates with the inside surface of the cylinder to divide the fluid cylinder 172 into a pressure chamber 184 and an ambient air chamber 186. A pressurized fluid inlet 188 is formed in the end of the tubular cylinder in the pressure chamber 184. The pressurized fluid inlet 188 is connected to a conventional source of pressurized fluid in the emergency brake system. An exhaust outlet 190 is formed in the side wall of the fluid cylinder. Air can freely pass into and out of the exhaust outlet in response to movement of the piston head 178 to maintain the ambient air chamber 186 at a pressure level substantially equal to the ambient air pressure. A fluid seal 194 is mounted in the base of the tubular cylinder to maintain an air-tight seal between the ambient air chamber 186 and the hollow interior of the support block 174.

The second end of the piston shaft 180 has a toothed rack 198 formed thereon. The rack 198 cooperates with a plurality of teeth 200 formed on the outer perimeter of a circular pinion 202. The pinion 202 is securely mounted to an axle shaft 204 which is rotatably mounted to the top plate 50. The ends of the axle shaft 204 are rotatably received in axle mounts 206, 208 which are secured to the underside of the top plate 50 (see FIG. 8). The central portion of the axle 204 is securely mounted to a support member 210. In this embodiment, the support member 210 is U-shaped and comprises a pair of tapered side walls 214, 216 and a bight wall 218 extending between the two sidewalls 214, 216.

The support member 210 is mounted to the top plate 50 such that it overlies the bumper plate 158. The support member 210 is also mounted for pivoting movement between an unobstructing position as seen in FIG. 6 and blocking position as seen in FIG. 7. A coil spring 192 is mounted on the axle shaft and biases the support member 210 into the obstructing position. One end of the spring is mounted to the support member 210 and the other end bears against the underside of the top plate 50. In the unobstructing position, the bight wall 218 abuts the underside of the top plate 50. In this position, the side walls 214, 216 do not obstruct or interfere with the full articulation of the air spring 30 because the bumper 70 is received between the tapered sidewalls 214, 216. When the support member 210 is rotated to the blocking position, the bottom edges 220, 222, 224 of the side walls 214, 216 and bight wall 218, respectively, are positioned immediately above the bumper plate 158 and the top edges 226, 228, 230 of the side walls and bight wall, respectively, abut the underside of the top plate 50. As the air pressure in the air spring decreases, the frame rail 14 will be lowered relative to the axle 16 and trailing arm 24 until the bottom edges 220, 222 and 224 of the support member 210 engage the bumper plate 158. The engagement of the support member 210 with the bumper 70 will prevent further downward movement of the frame rail 14 relative to the axle 16 and trailing arm 24.

Movement of the support member 210 between the articulating and blocking positions is controlled by the fluid pressure inside the fluid cylinder assembly 170. As noted above, pressurized fluid from the emergency air brake system is selectively introduced into the pressure chamber 184 of the fluid cylinder assembly 170 through the pressurized fluid inlet 188. This pressure will be supplied during normal operation of the tractor-trailer and emergency air brake system. When the pressurized air is no longer supplied by the emergency air brake system, pressurized air bleeds from the emergency air brake system thereby resulting in a loss of pressure in the pressure chamber 184. The support member 210 will remain in the unobstructing position until gravity and the spring bias supplied by the torsion spring 192 bearing on the support member overcomes the decreasing air pressure inside the pressure chamber 184. Once the spring 192 overcomes the air pressure, then the support member will rotate about the axle shaft 204, thereby raising the piston 176 inside the tubular cylinder and positioning the bottom edges 220, 222 and 224 immediately above the bumper plate 158.

When pressurized air is reintroduced into the emergency air brake system, pressurized air will be supplied to the pressure chamber 184 of the fluid cylinder assembly 170. The air pressure inside the pressure chamber 184 will quickly overcome the spring bias holding the support member in the blocking position thereby forcing the piston 176 downwardly, to the extended position which will in turn rotate the pinion 202, axle shaft 204 and support member 210 into the unobstructing position.

Figure 10:
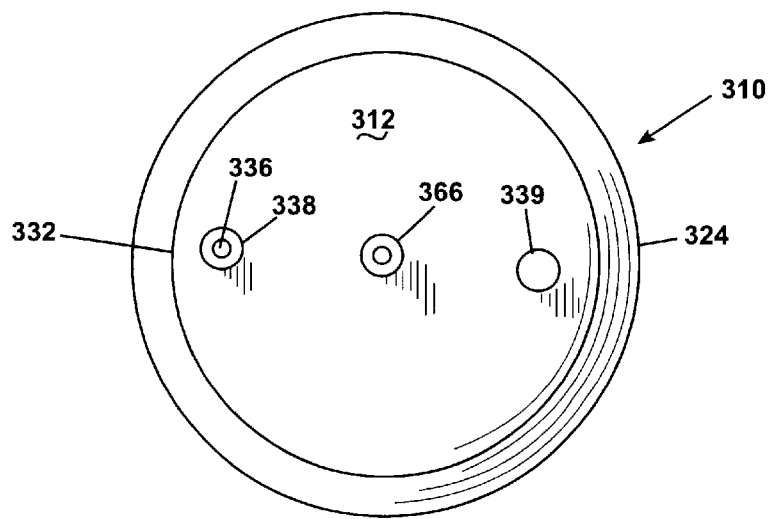
FIG. 10 is a view of the air spring of FIG. 9 taken along lines 10—10 of FIG. 9.
Figure 9:
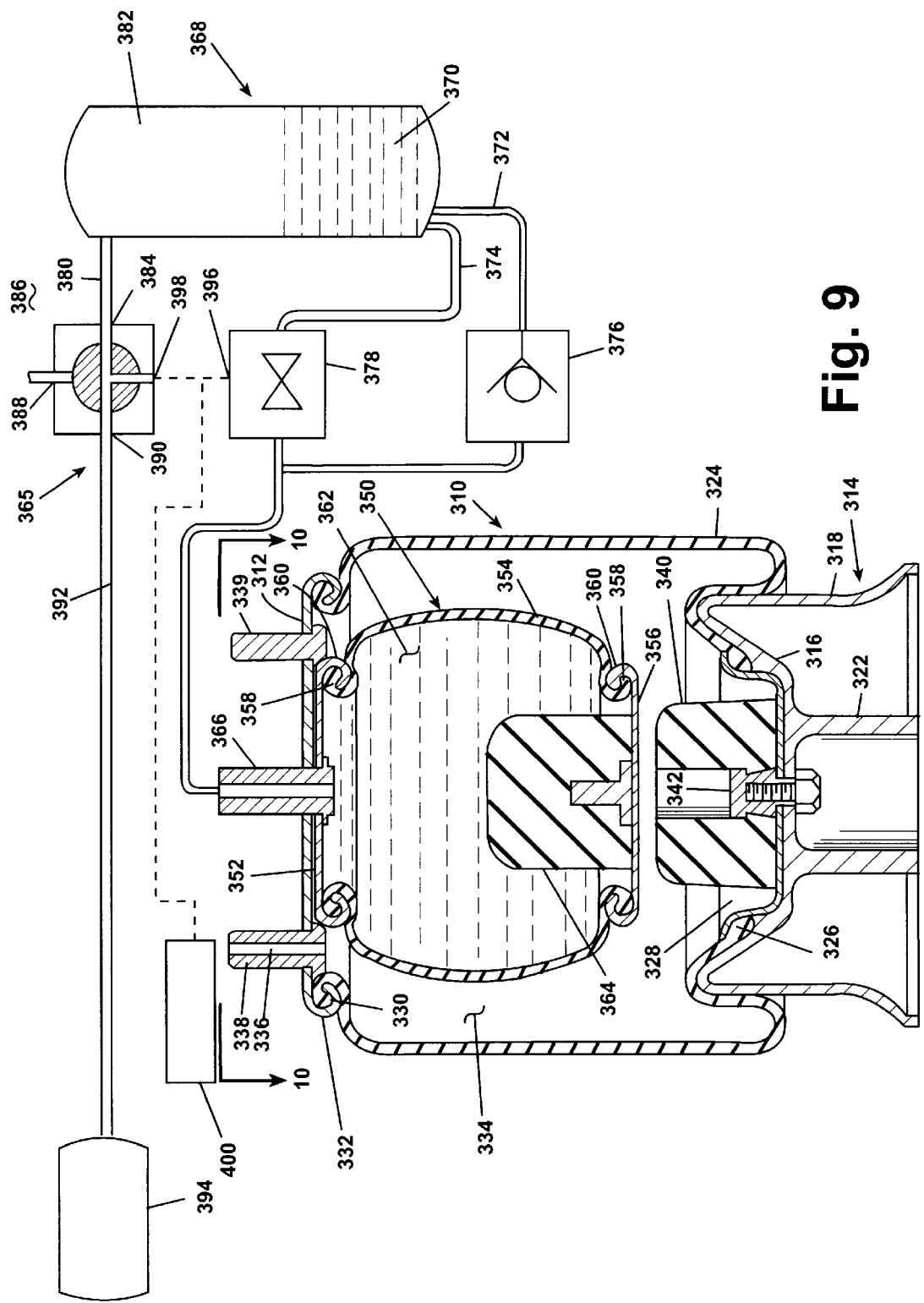
FIG. 9 is a cross-sectional elevational and diagrammatic view of a further embodiment of an air spring according to the invention in which an internal support member comprises a separate inflatable spring.

As illustrated in FIGS. 9 and 10, a further embodiment of an air spring 310 according the present invention has a similar basic structure to the air spring 30 and comprises a top plate 312 and an opposed axially spaced piston member 314. The piston 314 includes a base 316 and an annular wall 318 that extends downwardly from the base 316. An annular central supporting structure 322 extends downwardly from a central portion of the base 316.

As in the prior embodiment, a flexible tubular sleeve or air bag 324 extends between the top plate 312 and piston 314. A clamping plate 328 clamps a lower annular bead 326 onto the piston base 314 in an air tight sealing relationship. The opposite end of the air bag 324 carries an upper annular bead 330. An outer annular edge 332 of the top plate 312 curls about the upper bead 330 in an air tight sealing relationship to clamp the air bag 324 to the top plate 312. The top plate 312, air bag 324, and piston member 314 thus form a fluid tight chamber 334.

A source of pressurized air or other fluid communicates with the chamber 334 through a hollow bore 336 of a mounting stud 338 extending upwardly from the top plate 312. One or more additional mounting studs 339 (see also FIG. 10) extend upwardly from the top plate for mounting the air spring 310 into a vehicle suspension (not shown in FIG. 9) or other application.

A resilient bumper 340 of a type well known in the art mounts to the piston base 316 in a conventional fashion. For instance, the bumper 340 may snap onto a mounting post 342 as described in Ecktman, et al. U.S. Pat. No. 5,201,500, issued Apr. 13, 1993, and incorporated herein by reference.

A support member 350 extends from the top plate 312 toward the piston member 314. It has a similar construction to the air spring 310 and comprises a bead plate 352, a fluid bag 354, and a bottom plate 356. Rolled over outer edges 360 of the bead plate 352 and bottom plate 356 grasp beads 358 on the fluid bag 354 in the same manner that the air bag 324 connects to the top plate 312. Thus, the inner spring bead plate 352, air bag 354, and bottom plate 356 form an inner fluid tight chamber 362. Preferably, a bumper 364 extends upwardly from the bottom plate 356.

A control system 365 automatically inflates and deflates the support member as needed. A fitting 366 extends out of the inner chamber 362 through the bead plate 352 and top plate 312 to connect the inner chamber 362 to an accumulator 368. The accumulator 368 contains an incompressible fluid 370 and communicates with the inner chamber 362 through first and second accumulator lines 372 and 374 between the accumulator 368 and the fitting 366. A one-way check valve 376 is disposed in the first fluid line 372 and a pilot operated on/off valve 378 is disposed within the second fluid line 374. An air line 380 leads from an air space 382 above the fluid 370 in the accumulator 368 to a common port 384 of a pilot operated three-way valve 386.

The three-way valve 386 also contains a normally closed port 388 and a normally open port 390. The normally closed port 388 is open to atmosphere. An air line 392 connects the normally open port 390 to an air compressor tank 394 that is normally carried by the vehicle (not shown). Pilot ports 396, 398 on the on/off valve 378 and the three-way valve 386, respectively, are connected to the vehicle's emergency brake air system 400. Thus, the presence or absence of pressure in the emergency brake air system 400 controls the height of the support member 350.

During normal vehicle operation, the emergency brake air system 400 is pressurized to approximately 100 pounds per square inch of air pressure. Upon application of the emergency brakes, the emergency brake air system 400 is depressurized. The change in pressure in the emergency brake air system 400 controls extension and retraction of the support member 350.

When emergency brake air system pressure is present at the on/off valve pilot port 396, the on/off valve 378 opens to place the accumulator 378 into pressure communication with the inner chamber 362. Pressure at the three-way valve pilot port 398 places the normally closed port 388 into communication with the common port 384. Thus, the accumulator 368 is placed into communication with the atmosphere. The air spring chamber 334 is normally pressurized with a pressure that can vary between 10 and 100 pounds per square inch. This pressure is sufficient to compress the support member 350 and push any fluid 370 in the inner chamber 362 into the accumulator 368. With the emergency brake air system 400 pressurized, the air spring 310 thus operates in a conventional fashion.

Upon depressurization of the emergency brake air system 400, the pilot ports 396 and 398 no longer see pressure. This closes the on/off valve 378 and places the three-way valve normally open port 390 into communication with the common port 384. The 100 pounds per square inch of air pressure in the air compressor tank 394 acts against the fluid in the accumulator 368 to extend the support member 350 toward the bumper 340 on the piston 314. Fluid 370 flows through the first fluid line 372 and check valve 376 into the inner chamber 362. After the support member 350 has extended, the check valve 376 prevents the fluid 370 from leaving the inner chamber 362 regardless of the pressure in the air compressor tank 394 and accumulator air space 378. Therefore, the air spring 310 will maintain a design height regardless of increasing load in the vehicle or removal of the air supply by removal of the tractor.

When the operator releases the parking brakes by pressurizing the emergency brake air system 400, the accumulator air space 382 is again placed into communication with atmosphere and the on/off valve 378 opens. At this time, the air spring 310 will be pressurized so that pressure in the chamber 334 compresses the support member 350 and drives the fluid 370 back into the accumulator 368 through the open valve 378.

Figure 11:
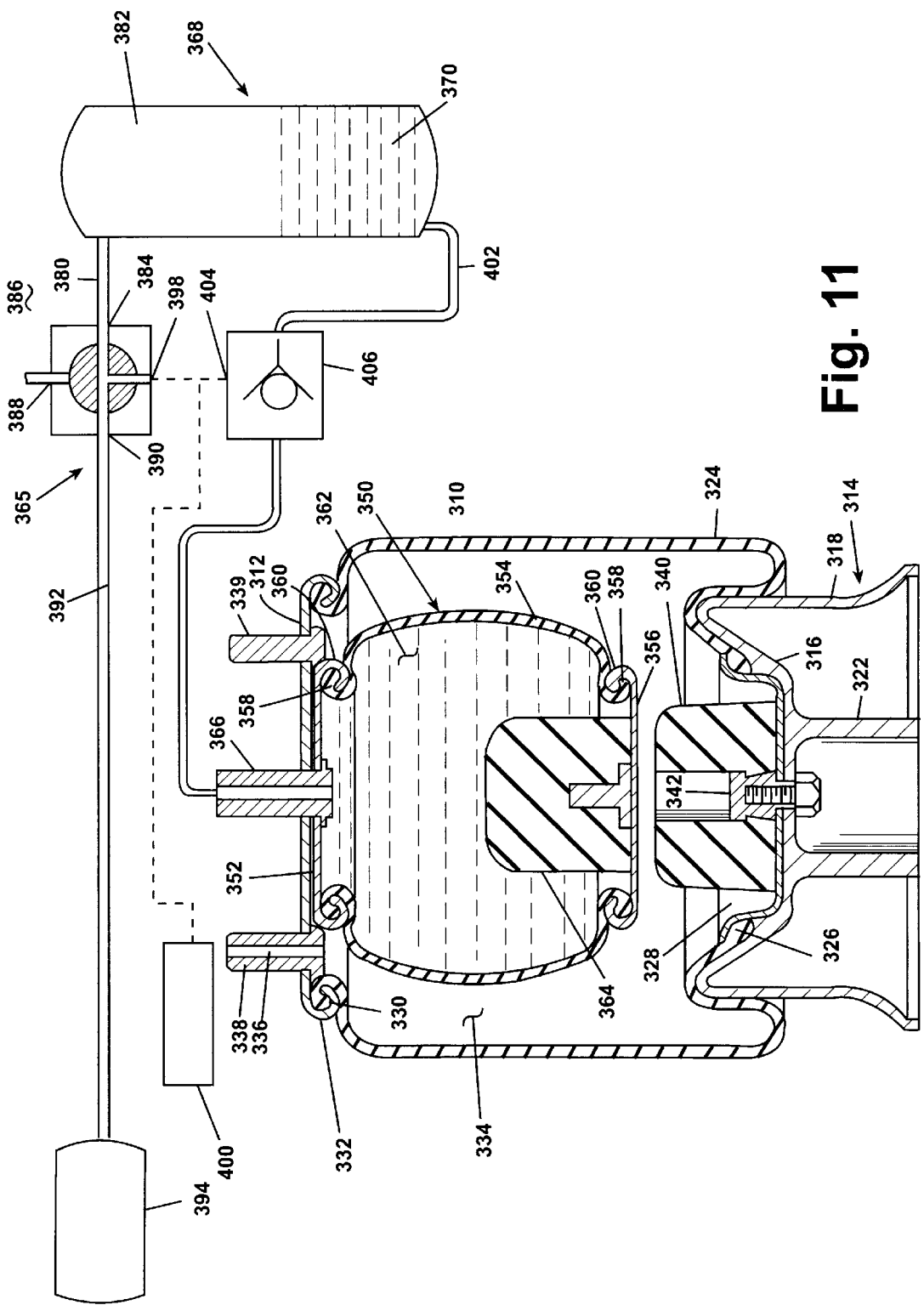
FIG. 11 is a cross-sectional elevational and diagrammatic view of a further embodiment of the air spring shown in FIGS. 9 and 10.

FIG. 11 illustrates a second embodiment of the invention which varies from the embodiment of FIG. 9 only in the valving arrangement. In this embodiment, a single fluid line 402 extends between the accumulator 368 and the fitting 366. A pilot operated check valve 406 is contained within the fluid line 402. It has a pilot port 404 in communication with the emergency brake air system 400. When the pilot port 404 sees pressure, the check valve 406 is always open so that fluid 370 can freely flow between the accumulator 368 and the inner chamber 362 in either direction. However, when pressure is removed from the pilot port 404, the check valve 406 operates as a standard check valve. Thus, when the vehicle is in normal operation and not parked, air pressure in the chamber 334 compresses the support member 350 to move the fluid 370 through the pilot operated check valve 406 and into the accumulator 368. When the vehicle is parked, air from the air compressor tank 394 flows through the three-way valve 386 to drive the fluid 370 into the inner chamber 362. The pilot operated check valve 406 prevents reverse flow from the inner chamber 362 into the accumulator 368 to hold the air spring 310 at a predetermined height.

Typically, an air spring for a semi-trailer suspension has an operating pressure of between 10 to 100 pounds per square inch and a burst strength of over 350 pounds per square inch. As the air spring 310 is intended for similar service, its operating parameters are comparable. To achieve this strength, the air bag 324 is formed of a bias ply construction, as is commonly known in the art of air springs. Bias plys of fabric reinforced rubber are sandwiched between inner and outer layers of calendered rubber to form the air bag 324. The inner sleeve 354 has similar construction but is designed to carry much higher pressures and to operate when filled with an incompressible fluid. Accordingly, it preferably has a burst strength of at least 800 pounds per square inch.

The fluid 370 can be of any type. Preferably it comprises a noncorrosive, incompressible liquid of a type which will not harm the rubber of the inner sleeve 354. It also preferably has a freezing point below the expected ambient temperatures in which the air spring 310 will see service. A mixture of propylene glycol and water would be suitable.

Figure 12:
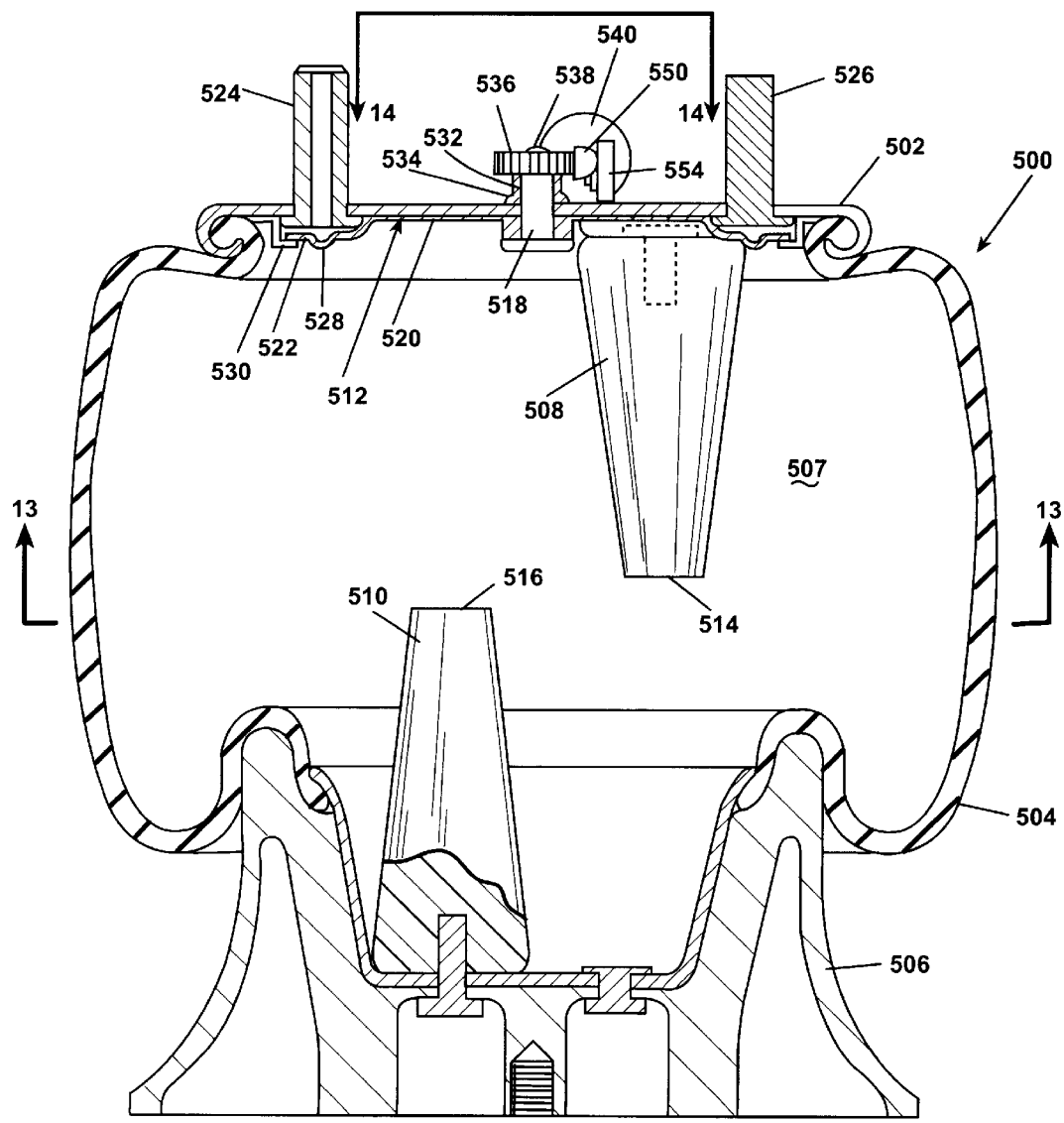
FIG. 12 is a cross-sectional elevational view of a further embodiment of an air spring according to the invention.
Figures 13, 14:
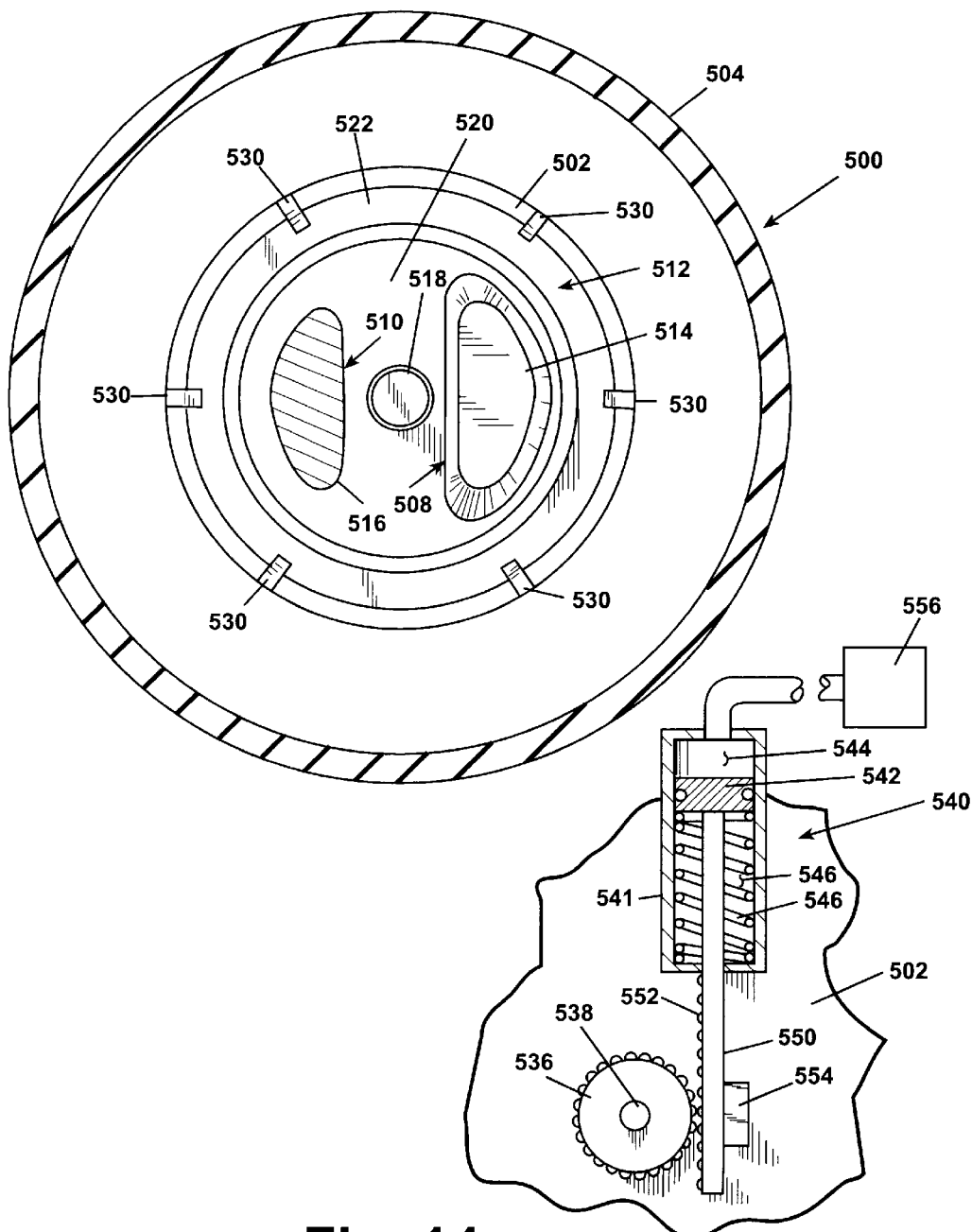
FIG. 13 is a cross-sectional view taken along lines 13—13 of FIG. 12.
FIG. 14 is a partial top plan view in partial section taken along lines 14—14 of FIG. 12.

FIGS. 12 to 14 illustrate a further embodiment of an air spring 500 according to the invention. As in the previous embodiments, the air spring 500 comprises a top plate 502, air bag 504 and piston 506 which together define a chamber 507. The air spring 500 also contains a support member in the form of an upper bumper 508 and a lower bumper 510. The lower bumper 510 mounts to the piston 506 off-of-center.

The upper bumper 508 is mounted to a rotating disk 512 on the top plate 502, also off-of-center. Thus, the upper bumper 508 can be rotated between a first position wherein the bumpers 508, 510 are vertically offset from each other so that the upper and lower bumpers 508 and 510 can move vertically free of each other as illustrated in FIG. 12 and a second position wherein the bumpers 508, 510 are vertically aligned. When the upper and lower bumpers 508 and 510 are in vertical alignment, the air spring 500 maintains a minimum predetermined height regardless of the air pressure within the chamber 507. When the upper and lower bumpers 508 and 510 are out of vertical alignment, the air spring 500 operates in a conventional manner. Namely, the piston 506 can move vertically a substantial distance relative to the top plate 502.

Each of the upper and lower bumpers 508 and 510 have the shape of a truncated half-cone with a D-shaped cross section and extend inwardly from the top plate 502 and piston 506, respectively, to terminate in horizonal abutment surfaces 514 and 516, respectively. Cylinders or other shapes can be used for the bumpers 508, 510 in lieu of the conical bumpers shown in the drawings. Preferably, each of the pistons 508 and 510 is formed of a molded Hytrel™ thermoplastic.

As seen in the air spring 30 illustrated in FIG. 1, the piston 34 moves through an arc toward the top plate 50 due to the rotation of the trailing arm 24 about its bushed connection 26. When the bumpers 508 and 510 in the air spring 500 are out of vertical alignment as illustrated in FIG. 12, their abutment surfaces 514 and 516 are preferably spaced apart horizontally a distance sufficient to prevent contact between the bumpers 508 and 510 as the piston 506 reciprocates relative to the top plate 50 in a normal operation (see FIG. 13).

A shaft 518 affixed to the center of the rotating disk 512 passes through the center of the top plate 502 and pivotally mounts the disk 512 in parallel proximity to the top plate 502. A central portion 520 of the rotating disk 512 is planar and an outer rim 522 of the rotating disk 512 is vertically offset from the central portion 520 to provide clearance for mounting bolts 524 and 526. One of the mounting bolts 524 is hollow to connect the chamber 507 to a source of pressurized air (not shown in FIG. 12) and an annular groove 528 provided in the outer rim 522, facing the mounting bolt 524, provides additional clearance for air to move between the chamber 507 and mounting bolt 524 past the rotating disk 512. A plurality of S-shaped lugs 530 (see also FIG. 13) affixed to the top plate 502 extend downwardly and under the rotating disk outer rim 522 to guide the rotating motion.

An annular collar 532, welded to the top of the top plate 502, carries an annular seal 534, such as an O-ring. The shaft 518 passes through the collar 532 and the annular seal 534 and prevents pressurized air from escaping the chamber 507.

A gear 536 mounts on to the shaft 518 adjacent the collar 532 and a lock-nut or other retainer 538 mounts on the end of the shaft 518 to complete the connection of the rotating disk 512 to the top plate 502. Thus, rotation of the gear 536 produces a corresponding rotation of the disk 512.

Turning to FIG. 14, an air cylinder assembly 540 mounts to the top plate 502 or other surface above the air spring 500. A piston 542 with an annular seal is mounted within a cylindrical casing 541 and divides the interior thereof into a pressure chamber 544 and a spring chamber 546, the latter of which is preferably at ambient pressure. A spring 548 in the spring chamber 546 biases the piston 542 into the pressure chamber 544.

A rod 550 extends from the piston out of the cylindrical casing 541 to mesh with the gear 536. Teeth 552 on the rod 550 mesh with the gear 536 so that movement of the piston 542 in the cylindrical casing 541 rotates the gear 536 and disk 512. A guiding block 554 or other means are preferably provided adjacent the gear 536 so that the rod 550 moves between the guiding block 554 and the gear 536 to keep the teeth 552 in positive engagement with the gear 536.

An emergency brake air system 556, as described with reference to the prior embodiments, provides the motive force for rotating the disk 512. It is connected to the piston pressure chamber 544. Thus, when the emergency brake air system 556 is pressurized, the pressure in the pressure chamber 544 overcomes the force of the spring 548 and drives the piston 542 and shaft 550 outwardly to rotate the disk 512 into the position illustrated in FIG. 12 wherein the upper and lower bumpers 508 and 510 are vertically clear of each other.

Upon depressurizing the emergency brake air system 556, the spring 548 drives the piston 542 inwardly of the cylindrical casing 541. The corresponding movement of the rod 550 causes the disk 512 to rotate, placing the bumpers 508 and 510 into vertical alignment with each other. If the vehicle is then loaded placing additional load on the air spring 500, or if air leaks out of the chamber 507, the abutting upper and lower bumpers 508 and 510 will support the air spring 500 at a predetermined height.

In an alternative embodiment, the upper and lower bumpers 508 and 510 can be circular in cross section or other complementary shapes instead of D-shaped in cross section to provide additional support.

Figure 15:
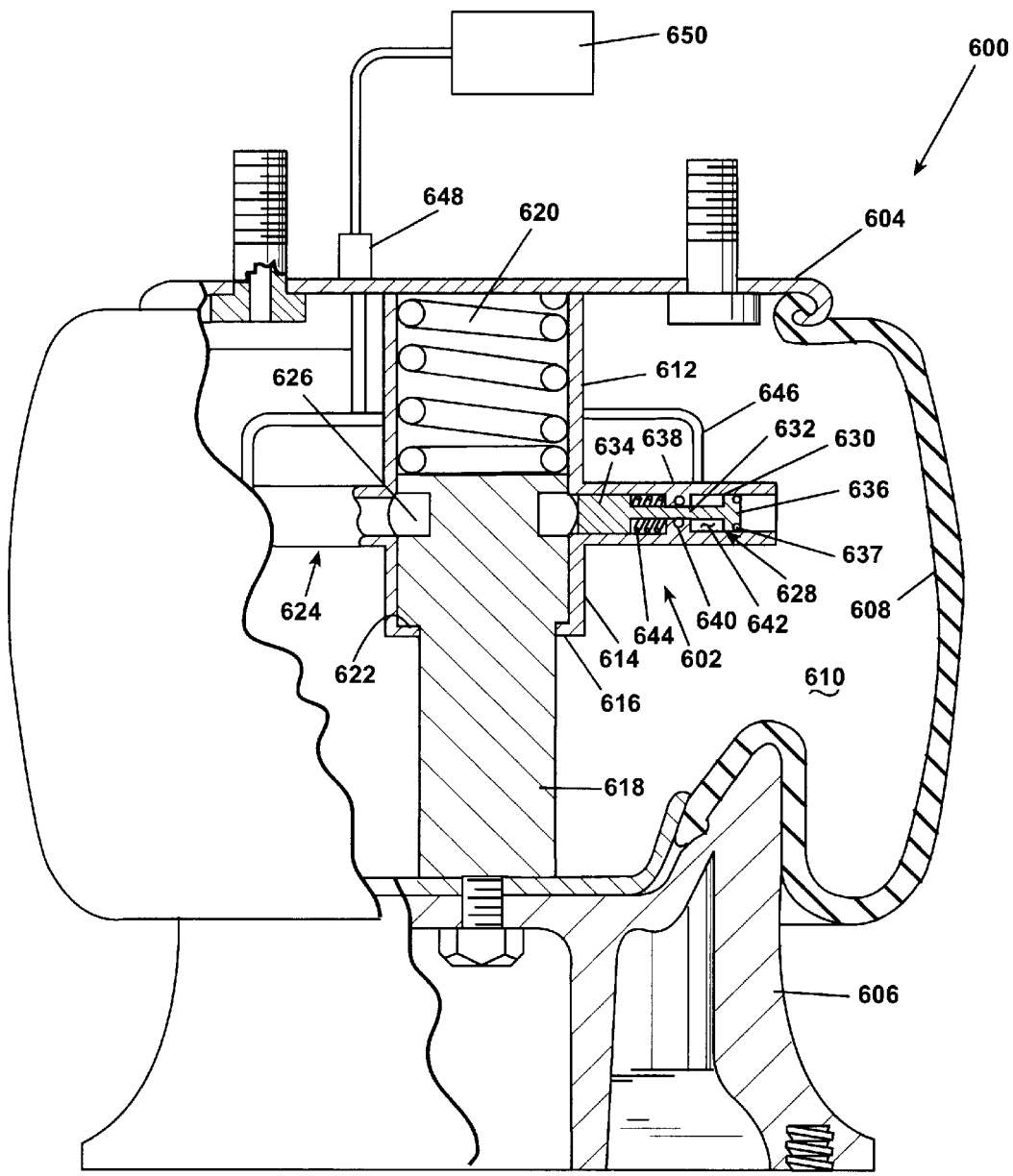
FIG. 15 is a cross-sectional elevational view of a further embodiment of an air spring according to the invention in which a support member comprises a telescoping inner bumper lockable with pins.

FIG. 15 illustrates a further embodiment of an air spring 600 according to the invention in which a support member in the form of a telescoping bumper 602 extends between a top plate 604 and piston 606. As in the previous embodiments, an air bag 608 between the top plate 604 and piston 606 forms a substantially hollow chamber 610. The telescoping bumper 602 is thus disposed within the chamber 610.

The telescoping bumper 602 comprises a tubular cylinder 612 that depends downwardly from the top plate 604 and terminates in a free end 614 having an inwardly directed annular lip 616. A cylindrical bumper member 618 is restrained to slide linearly within the cylinder 612. A spring 620 extends between the top plate 604 and the bumper member 618 to bias the bumper member 618 toward the piston 606. The annular lip 616 abuts an annular shoulder 622 on the bumper member 618 to limit movement of the bumper member 618 out of the cylinder 612.

A plurality of pin stops 624 mount on the cylinder 612 in a position to extend into the cylinder 612 and be received within slots or an annular groove 626 on the bumper member 618, thereby fixing its position relative to the cylinder 612. Each of the pin stops 624 comprises a pin 628 disposed within a pin cylinder 630 and having an elongated cylindrical body 632 with a pin head 634 at one end for receipt within the groove 626 and a piston 636 at an opposite end. An annular seal 637 is mounted in the piston 636 to provide a substantially air-tight seal. The pin body 632 passes through a wall 638 in the pin cylinder 630 and is sealed thereto by an annular seal 640. The wall 638 and piston 636 thus form a pressure chamber 642 within the pin cylinder 630. A spring 644 mounted between the pin head 634 and the wall 638 biases the pin 636 toward the bumper member 618. Pressure in the pressure chamber 642 can overcome the bias of the spring 644 to hold the pin head 634 within the pin cylinder 630 and free of the bumper member 618.

To provide pressurized air for the individual pressure chambers 642, a network of pressure lines 646 connect them to a fitting 648 in the top plate adapted to be connected to a vehicle's emergency brake air system 650. Thus, when the emergency brake air system 650 is pressurized, the pins 628 will be retracted. When the vehicle is parked and the emergency brake air system 650 is depressurized to apply the parking brakes (not shown), the springs 644 will press the pin heads 634 into the groove 626 in the bumper member, thereby locking the bumper member 618 in an extended position As the vehicle is loaded and additional weight is applied to the air spring 600, the telescoping bumper 602 will maintain the desired spacing between the top plate 604 and the piston 606. When the loading is complete and the source of pressurized air (not shown) for the air spring chamber 610 is restored the pressure in the air spring chamber 610 will relieve the stress between the pin heads 634 and the bumper member 618. Accordingly, when the emergency brake air system is depressurized, the pressure in the pin cylinder chambers 642 will pull the pins 628 out of the cylinder 612.

Figure 17:
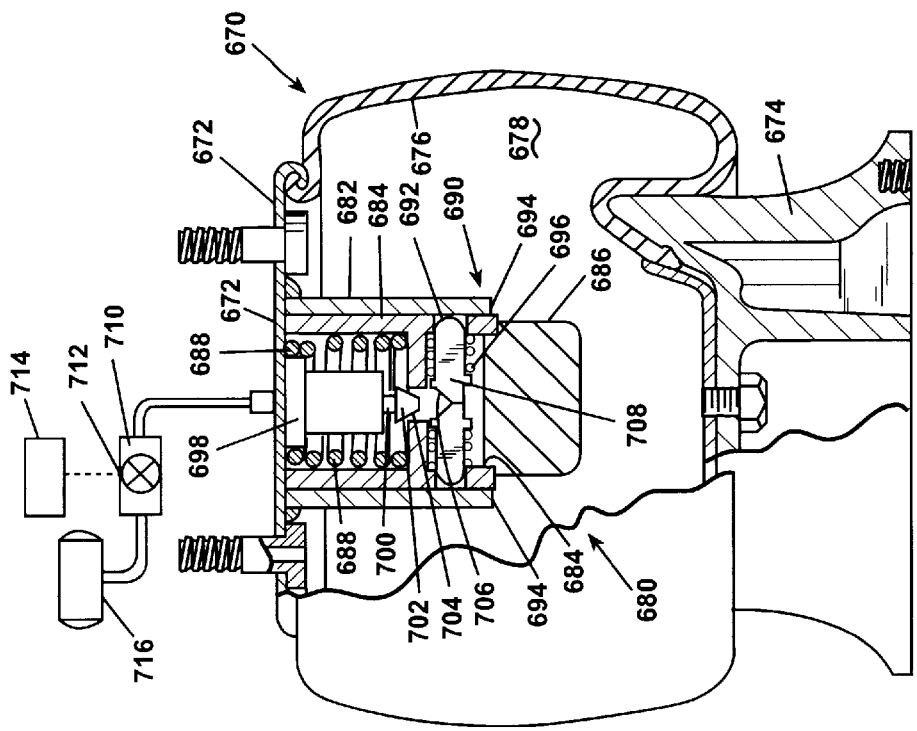
FIG. 17 is a cross-sectional elevational view of the air spring of FIG. 16 and showing the pins retracted.
Figure 16:
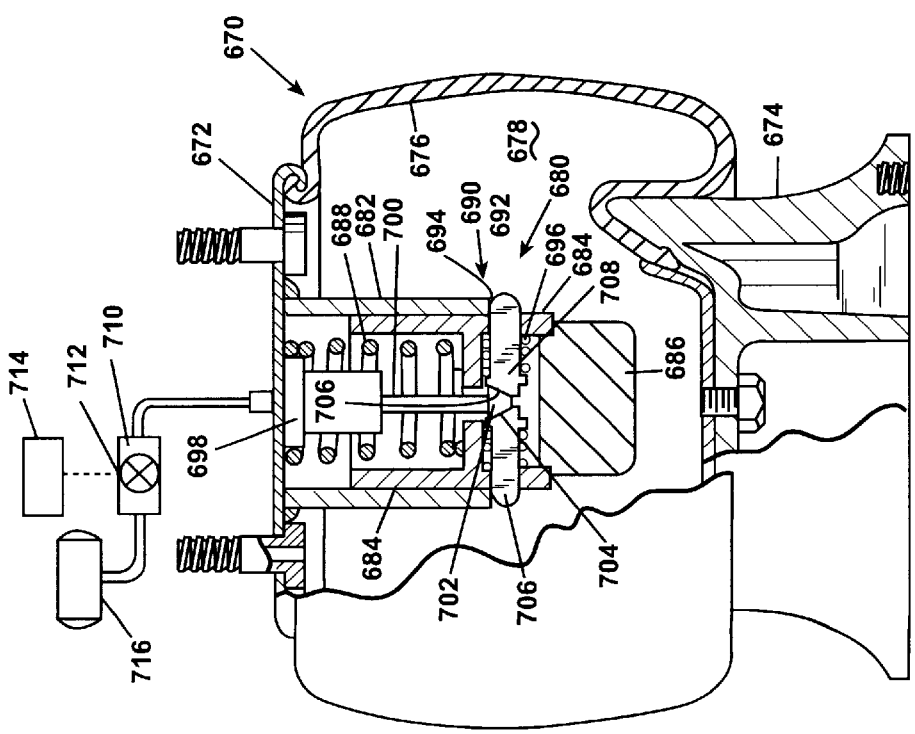
FIG. 16 is a cross-sectional elevational view of a further embodiment of an air spring according to the invention in which a support member comprises a telescoping inner bumper lockable with pins and showing the pins extended.

Other means for providing a telescoping bumper support member, such as the bumper 602, are possible. For instance, FIGS. 16 and 17 illustrate a further embodiment of an air spring 670 comprising a top plate 672, a piston 674 and an air bag 676 forming a substantially hollow chamber 678 and having a support member in the form of a telescoping bumper 680 that extends between the top plate 672 and piston 674. The telescoping bumper 680 comprises a first cylinder 682 depending vertically from the top plate 672 and a second cylinder 684 slideably and coaxially received within the first cylinder 682. A bumper member 686 is coaxially received within the second cylinder 684 and extends toward the piston 674. It is biased toward the piston 674 by a spring 688 between the top plate 672 and the second cylinder 684.

A locking mechanism 690 for locking the position of the second cylinder 684 and bumper member 686 with respect to the first cylinder 682 comprises a plurality of pins 692 or ball bearings that extend outwardly from the second cylinder 684 to abut an end edge 694 of the first cylinder 682 as shown in FIG. 16. Springs 696 bias the pins 692 inwardly of the second cylinder 684 to normally position the pins 692 clear of the first cylinder end edge 694 as shown in FIG. 17.

An air cylinder 698 or other selectively extendable means depends from the top plate 672 and includes an actuator rod 700 which extends towards the pins 692 and terminates in a head 702. Sloping surfaces 704 and 706 on the head 702 and pin inward ends 708, respectively, cam over each other when the head 702 extends to abut the pins 692, thus forcing the pins outwardly into the position shown in FIG. 16.

A pilot operated valve 710 having a pilot port 712 in communication with a vehicle emergency brake air system 714 controls extension of the actuator rod 700. The valve 710 is interposed between a vehicle air tank 716 and the air cylinder 698. When pressure is present at the pilot port 712, and thus in the emergency brake air system 714, the valve 710 is closed and the actuator rod 700 is retracted. The springs 696 keep the pins 692 inside the second cylinder 684 and out of abutment with the first cylinder end edge 694, as shown in FIG. 17.

When the vehicle is parked and the emergency brake air system 714 is depressurized, the valve 710 opens, extending the head 702 into abutment with the pins 692 and driving the bumper member 686 and second cylinder 684 downwardly relative to the first cylinder 682 and the pins 692 outwardly into abutment with the first cylinder end edge 694. The telescoping bumper 680 will thus hold the desired spacing between the top plate 672 and the piston 674, even after the chamber 678 is separated from its source of pressurized air and fails to receive enough additional air to maintain the design spacing on its own. Even if pressure is not maintained in the air cylinder 698, the weight of the vehicle on the pins 692 will hold them in the outward position until the air spring chamber 678 is again placed into communication with a source of pressurized air for the air spring to maintain its desired height without the aid of the telescoping bumper 680.

An alternative to the structure depicted in FIGS. 16 and 17 would be to replace the air cylinder 698 and compression spring 688 with a double-acting air cylinder which would extend and retract the bumper member 686, second cylinder 684 and pins 692 in response to the relative air pressure inside the double-acting fluid cylinder. In this case, a suitable source of pressurized air would be required for extension and an air source for retraction of the cylinder. Yet another modification to this structure would be to mount a spring internally inside the air cylinder to bias the air cylinder into either the extended or retracted position and require a suitable source of pressurized air to bias the air cylinder into the other of the extended or retracted positions. For example, a spring could be located inside the air cylinder to extend and lock the bumper in the position seen in FIG. 16 and pressurized air would be supplied to the air cylinder to overcome the bias of the spring and retract the bumper to the position as seen in FIG. 17.

Figure 18:
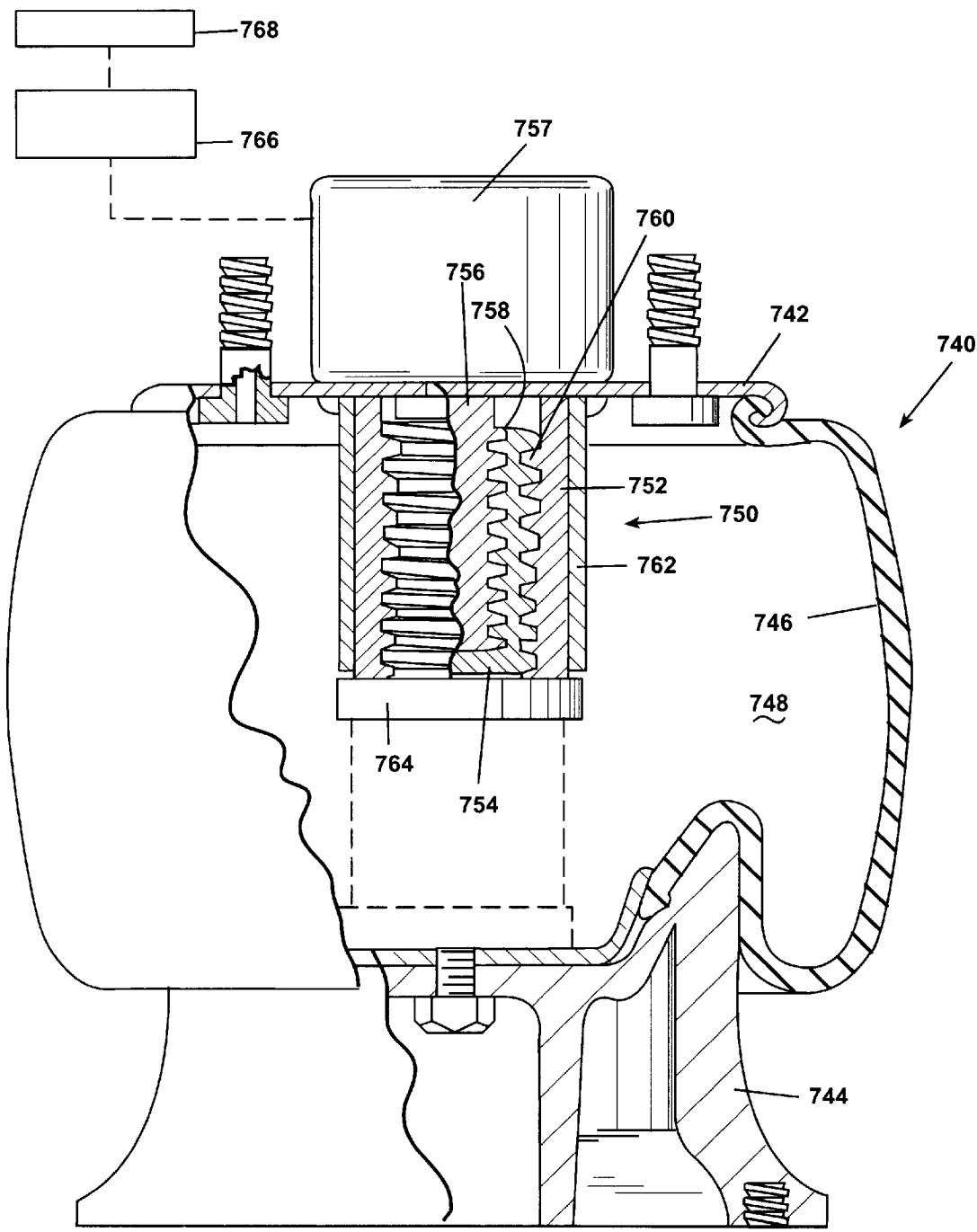
FIG. 18 is a cross-sectional elevational view of a further embodiment of an air spring according to the invention in which a support member comprises a threaded telescoping bumper.

FIG. 18 illustrates an air spring 740 having a top plate 742 and piston 744, with an air bag 746 therebetween to form a chamber 748. According to another embodiment of the invention, a support member in the form of a telescoping bumper 750 depends from the top plate 742 and comprises telescoping outer, intermediate and inner cylinders 752, 754 and 756, coaxially received within one another. An electric or pneumatic motor 757 rotates the inner cylinder 756.

Acme threads 758 or other power threads form between the inner cylinder 756 and intermediate cylinder 754 and additional Acme threads 760 between the intermediate and outer cylinders 754 and 752 provide for telescoping movement of the cylinders 752, 754 and 756 upon rotation of the inner cylinder 756. An outer cylindrical casing 762 depends from the top plate 742. It encircles the outer cylinder 752 to guide the vertical movement of the three cylinders 752, 754 and 756 and prevent rotation of the outer cylinder 752. Preferably, a soft bumper member 764 extends toward the piston 744 from the outer cylinder 752.

A control system 766 controls the extension of the telescoping bumper 750, preferably employing the presence of air pressure in a vehicle emergency brake air system 768 as an input. For instance, when the emergency brake air system 768 is pressurized, the control system 766 holds the telescoping bumper 750 in a retracted position as shown in FIG. 18. When the vehicle is parked and the emergency brake air system 768 is depressurized, the control system 766 engages the motor 757 to rotate the inner cylinder 756. This rotation engages the threads 758 to extend the intermediate cylinder 754. When the intermediate cylinder 754 is fully extended and the threads 758 lock, the intermediate cylinder 754 will start to rotate. This rotation will engage the threads 760 to extend the outer cylinder 752. Preferably, the control system 766 will sense the full extension of the telescoping bumper 750 (as by counting steps in a stepping motor, sensing a high current or sensing increased pneumatic pressure, depending upon the type of motor 757) and deactivate the motor 757 when full extension is reached. When the vehicle is ready for movement and the emergency brake air system 768 is again pressurized, the control system will operate the motor 757 to retract the telescoping bumper 750 in a reverse manner to the extension described above.

Figure 19:
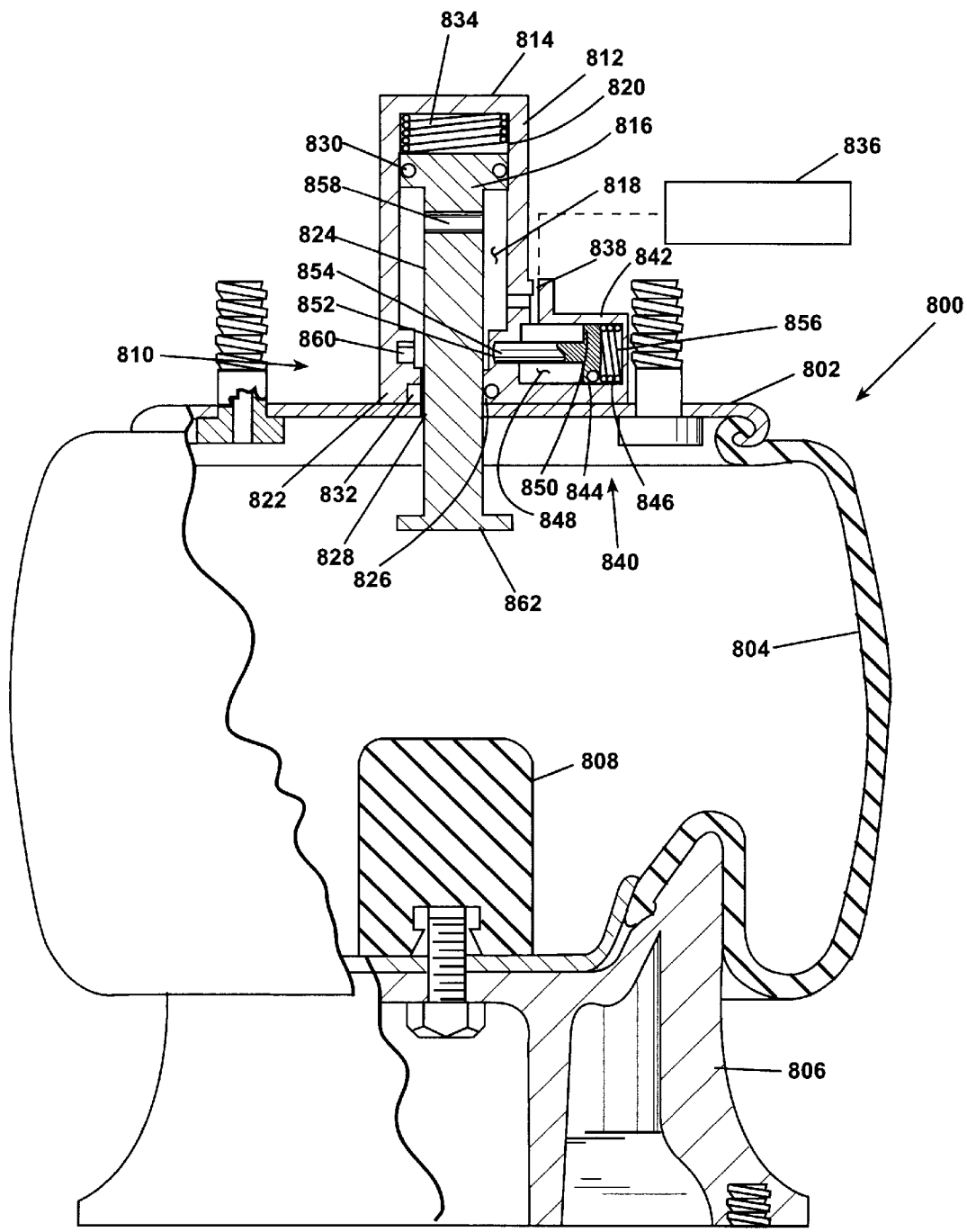
FIG. 19 is a cross-sectional elevation view of a further embodiment of an air spring according to the invention in which a support member comprises a telescoping inner bumper lockable with pins.

FIG. 19 illustrates a further embodiment of an air spring 800 according to the invention and having a top plate 802, air bag 804, piston 806, and an internal bumper 808 projecting upwardly from the piston 806 as in the first several embodiments. A support member in the form of a retractable support member 810 extends between the top plate 802 and the bumper 808 to support the air spring 800 while a vehicle (not shown) incorporating the air spring 800 is being loaded. The support member 810 comprises a cylindrical housing 812 extending upwardly from the top plate 802 and terminating in an end wall 814. A piston 816 divides the interior of the housing 812 into a pressure chamber 818 and a spring chamber 820, with the spring chamber 820 being located adjacent the housing end wall 814. The pressure chamber 818 is enclosed by the piston 816, the housing 812 and an inner wall 822 of the housing 812 that is attached to the top plate 802. A rod 824 extends from the piston 816 through apertures 826 and 828 in the inner wall 822 and top plate 802 to extend into the air spring 800 toward the bumper 808. A fluid seal 830 encircles the piston 816 and a second fluid seal 832 at the aperture 826 in the inner wall 822 encircles the rod 824 to seal the pressure chamber 818.

A spring 834 extends between the piston 816 and the end wall 814 to bias the rod 824 toward the bumper 808. However, the pressure chamber 818 is in pressure communication with a vehicle emergency brake air system 836 through a port 838 in the housing 812. The pressure in the emergency brake air system 836, when applied to the pressure chamber 818, acts against the piston 816 to overcome the bias of the spring 834 and urge the rod 824 upwardly and away from the bumper 808.

A locking mechanism 840 is provided for locking the rod 824 in an extended position (toward the bumper 808). The locking mechanism 840 comprises a cylinder 842 intersecting the cylinder housing 812 and containing a piston 844 that divides the cylinder 842 into a spring chamber 846 and a pressure chamber 848. An O-ring 850 encircles the piston 844 to provide an air tight seal between the spring chamber 846 and pressure chamber 848.

The locking mechanism 840 further comprises a pin 852 that extends from the piston 844 and through an aperture 854 between the cylinder 842 and cylindrical housing 812. A spring 856 in the spring chamber 846 biases the pin 852 toward the rod 824. Conversely, pressure in the pressure chamber 848 biases the pin 852 away from the rod 824 so that application of their pressure to the pressure chamber 848 can control the position of the pin 852.

The pressure chamber 848 of the cylinder 842 communicates with the pressure chamber 818 of the cylindrical housing 812 and thus with the emergency brake air system 836 through the common port 838. When applied to the pressure chamber 848, the operating pressure in the emergency brake air system 836 is sufficient to overcome the force of the spring 856 so that the pin 852 is normally retracted.

An aperture 858 is provided through the rod 824 and a receiving well 860 is provided in the cylindrical housing 812 in alignment with the aperture 854. The aperture 858 through the rod 824 is positioned so that when the rod 824 is extended toward the bumper 808, the pin 852 can extend through the aperture 858 into the receiving well 860 to lock the rod 824 in an extended position.

In operation, the pressure chambers 818 and 848 in the cylindrical housing 812 and cylinder 842 are normally pressurized under the influence of air from the emergency brake air system 836. Thus, the rod 824 and pin 852 are retracted as illustrated in FIG. 19. When the vehicle (not shown) is parked and the emergency brakes (also not shown) are applied by depressurizing the emergency brake air system 836, the spring 820 extends the rod 824 toward the bumper 808. Simultaneously, the spring 856 extends the pin 852 into a abutment with the rod 824. The pin 852 abuts up to the rod 824 until the aperture 858 through the rod 824 is aligned with the pin 852. At this point, the pin 852 extends through the rod 824 and into the receiving well 860. The rod 824 is thus securely locked in an extended position. An abutment plate 862 at a lower end of the rod 824 abuts the bumper 808 so that the rod 824 holds the air spring 800 at a predetermined height, even if pressure is lost within the air spring 800.

Figure 20:
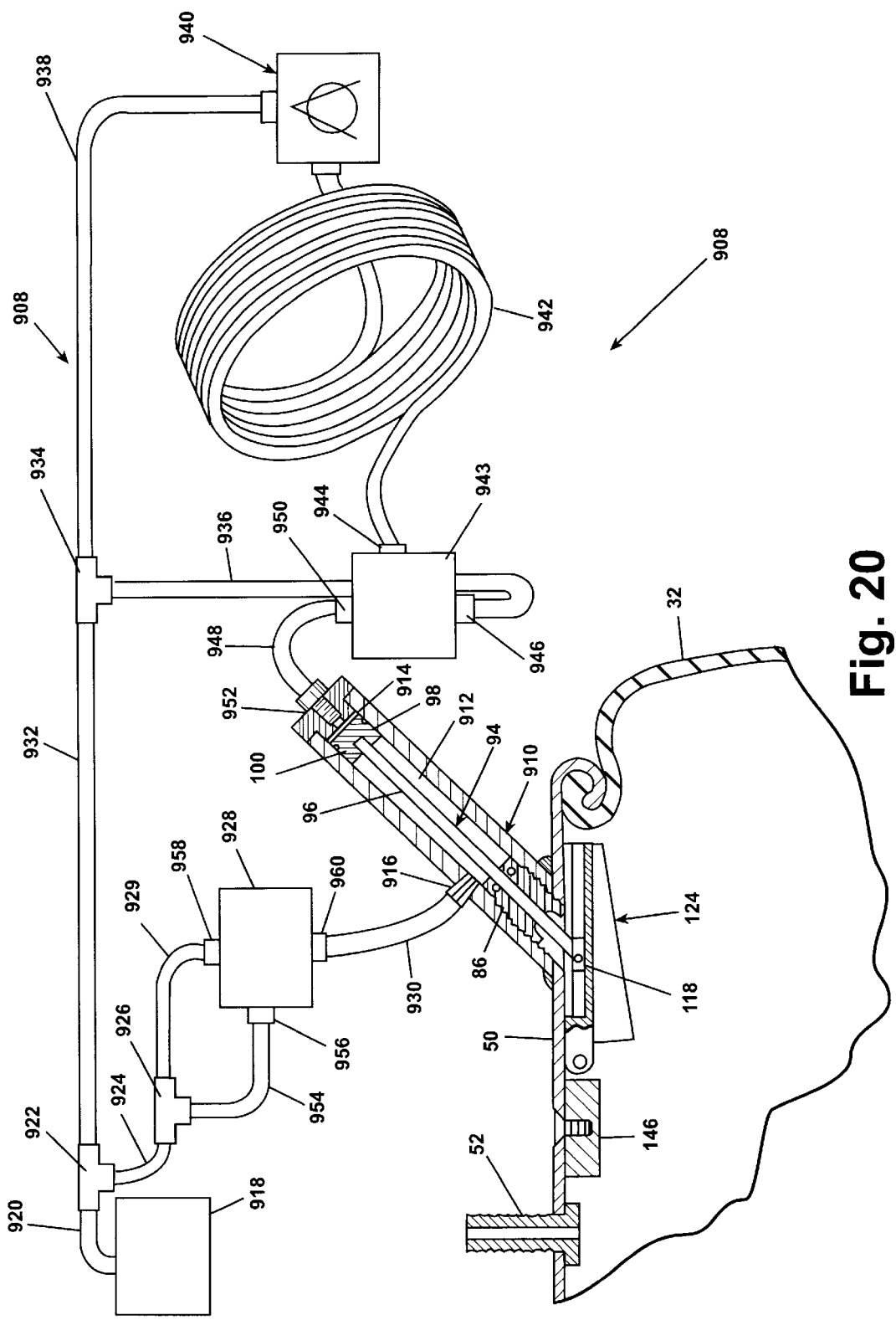
FIG. 20 is a schematic view of an alternative embodiment of the means to bias the support member into the extended and retracted positions.

When the vehicle is loaded and ready for leaving the loading dock (also not shown), the air spring 800 is pressurized, thereby relieving load between the rod 824 and pin 852. When the emergency brake air system 836 is pressurized to release the parking brakes, the pin 852 retracts out of the aperture 858 and the rod 824 also retracts away from the bumper 808. The air spring 800 is then in condition to operate in a normal fashion Several of the embodiments described above incorporate a fluid cylinder to actuate the support member between the extended and retracted positions. In several of these embodiments, air pressure is applied to the cylinder to actuate the support member to either the extended or retracted position and a conventional spring is used to bias the support member into the other of the extended or retracted positions. FIG. 20 shows an alternative to this structure. In this embodiment, a double-acting fluid cylinder 910 is mounted to the top of the top plate 50. The double-acting fluid cylinder 910 is shown in FIG. 20 mounted to the first embodiment of the support member as seen in FIGS. 2–5, although it is understood that the double-acting cylinder can be substituted into any of the fluid cylinders of the several embodiments described herein.

The double-acting fluid cylinder 910 comprises a piston 94 having a piston head 98 with a fluid seal 100 mounted therein. The piston head 98 divides the fluid cylinder 910 into a first pressure chamber 912 and a second pressure chamber 914. Movement of the piston 94 within the fluid cylinder 910 is dependent upon the relative fluid pressures inside the two pressure chambers 912, 914. The first pressure chamber 912 has a first fluid inlet 916 which is interconnected to the emergency air brake system 918 through a first supply line 920, a first T-connector 922, a second supply line 924, a second T-connector 926, a third supply line 929, a first pilot valve 928 and a fourth supply line 930. The first T-connector 922 conveys pressurized fluid from the emergency air brake system 918 to both the second supply line 924 and a fifth supply line 932. The other end of the fifth supply line 932 is mounted to a third T-connector 934. The third T-connector splits the fluid to a first pilot line 936 and a check-valve line 938. The check-valve line 938 conveys the pressurized fluid to a one-way check valve 940 which in turn supplies the pressurized fluid to a fluid reservoir line 942. The fluid reservoir line 942 terminates at a reservoir inlet 944 formed on a second pilot valve 943. Similarly, the first pilot line 936 terminates at a pilot inlet 946 of the second pilot valve 943. One end of an extension supply line 948 is mounted to the pilot valve outlet 950 of the second pilot valve 943. The other end of the extension supply line 948 is mounted to a second fluid inlet 952 formed in the second pressure chamber 914 of the fluid cylinder 910.

The first T-connector 922 conveys pressurized fluid to the second supply line 924 and second T-shaped connector 926. The T-connector splits the pressurized fluid between a second pilot line 954 and the third supply line 929. The second pilot line 954 terminates at a pilot inlet 956 of the first pilot valve 928 and the third supply line 929 terminates at a fluid inlet 958 of the pilot valve 928. One end of the fourth supply line 930 is mounted to the pilot valve outlet 960 and interconnects the pilot valve 928 and the first pressure chamber 912.

In operation, the fluid pressure system 908 extends and retracts the support member 124 in response to the pressure supplied by the emergency air brake system 918. When the emergency air brake system 918 is pressurized, pressurized air will flow through the first supply line 920 and is split between the second supply line 924 and the fifth supply line 932. The air which is diverted to the fifth supply line 932 will again be split at the third T-connector 934 and be conveyed to the check valve 940 and the pilot inlet 946 of the second pilot valve 943. The pressurized air will flow through the check valve 940 into the fluid reservoir line 942. Similarly, the pressurized air will flow through the first pilot line 936 to the second pilot valve 943. When pressure is applied to the pilot inlet 946 of the pilot valve, the valve is rotated such that the reservoir inlet 944 is blocked and the pilot valve outlet 950 is open to the environment. In this position, the second pressure chamber 914 will remain at atmospheric pressure.

As the emergency air-brake system 918 supplies pressurized air to the first T-connection 922, a portion of the pressurized air is supplied to the second T-connector 926 which diverts a portion of the pressurized air through the second pilot line 954 to the pilot inlet 956. When pressurized air is applied to the pilot inlet 956, the valve is rotated such that a fluid conduit is created between the fluid inlet 958 and the pilot valve outlet 960. Therefore, pressurized air will be supplied directly from the emergency air-brake system 918 to the first pressure chamber 912.

When the emergency air-brake system ceases to supply pressurized air, both the pilot valves 928, 943 will alter their relative orientation. For example, when the pilot inlet 956 of the pilot valve no longer receives a supply of pressurized air, the pilot valve will rotate such that the pilot valve outlet 960 and fourth supply line 930 are open to the environment. Pressurized air inside the first pressure chamber 912 will vent to the environment.

When the source of pressurized air supplied to the pilot inlet 946 of the second pilot valve 943 ceases, the valve will rotate such that a fluid conduit is created between the reservoir inlet 944 and the pilot valve outlet 950. Therefore, the pressurized air which is contained in the fluid reservoir line 942 flows into the second pressure chamber 914 causing extension of the piston 94 and rotation of the support member 124 into the extended position. The check-valve 940 prevents the pressurized air from flowing back into the third T-connector 934. When the emergency air-brake system 918 is reenergized to supply pressurized air to the fluid pressure system 908, the pilot valves will rotate such that the first pressure chamber 912 receives pressurized air from the air-brake system 918 and the second pressure chamber 914 is vented, thereby causing retraction of the piston 94 and pivoting movement of the support member 124 from the extended to the retracted position as seen in FIG. 20.

While certain embodiments have been described in this disclosure, the invention is not limited to these specific embodiments. Reason variation and modification are possible within the scope of the invention without departing from its true spirit and scope. For instance, other support members can extend between the top plate and the piston to maintain the height of the air spring in the absence of air pressure in the vehicle air system. Also, different forms of air springs are well known and can be used in lieu of the particular basic structure of the air spring 30. Thus, the description of the particular embodiments is by way of illustration and not limitation, and the scope of the appended claims should be construed as broadly as the prior art will permit.

The embodiments of the invention in which an exclusive property or privilege is claimed are defined as follows:

1. An air spring assembly comprising a top plate adapted for mounting to a vehicle frame; a piston adapted for mounting to a suspension and a substantially hollow air bag wherein, during normal operation, the air bag is pressurized and the piston and top plate move toward and away from each other in response to forces acting on the suspension and vehicle frame;

a support member pivotally mounted to the top plate inside the air bag for selective movement between first and second positions, wherein movement of the piston relative to the top plate is unrestricted during normal operation of the air spring when the support member is in the first position; an actuator for moving the support member between the first and second positions, the actuator being mounted between the support member and the top plate; and the support member, in the second position, forms a rigid support between the piston and the top plate whereby the movement of the piston relative to the top plate toward each other is restricted.

2. The improved air spring assembly according to claim 1 wherein the actuator comprises:

an air cylinder mounted to the top plate adapted to receive pressurized fluid from a fit suitable source;

the air cylinder comprising an air cylinder piston rod having a proximal end and a distal end, the proximal end being slidably mounted for reciprocable movement and the distal end being interconnected to the support member;

wherein the positions of the air cylinder piston rod and the support member relative to the top plate are dependent upon the fluid pressure inside the air cylinder.

3. The improved air spring assembly according to claim 2 wherein the air cylinder is a double acting cylinder having a first pressure chamber and a second pressure chamber, the first pressure chamber being fluidly connected to the first suitable source of pressurized fluid and the second pressure chamber being fluidly connected to a second suitable source of pressurized fluid;

wherein the positions of the air cylinder piston rod and the support member relative to the top plate are dependent upon the relative fluid pressure inside the first and second pressure chambers.

4. The improved air spring assembly according to claim 3 wherein the first suitable source of pressurized fluid comprises an emergency air brake system and the second source of pressurized fluid comprises a fluid reservoir adapted to receive and store pressurized fluid from the emergency air brake system.

5. The improved air spring assembly according to claim 4 and further comprising a first valve mounted intermediate and in fluid communication with the second pressure chamber and the fluid reservoir, the first valve being fluidly connected to the emergency air brake system and moveable between open and closed positions to control the flow of pressurized fluid from the reservoir to the second pressure chamber, the movement of the first valve between the open and closed positions being responsive to the relative pressure supplied by the emergency air brake system to the first valve, wherein the first valve is closed when the emergency air brake system is supplying pressurized air, and the first valve is moved to the open position when the pressure supplied by the emergency air brake system terminates, thereby supplying the pressurized fluid contained in the reservoir to the second pressure chamber.

6. The improved air spring assembly according to claim 5 and further comprising a one-way check valve mounted intermediate and in fluid communication with the emergency air brake system and the fluid reservoir, the check valve is mounted to allow the flow of pressurized fluid from the emergency air brake system to the fluid reservoir and prevent the reverse flow of pressurized fluid.

7. The improved air spring assembly according to claim 4 and further comprising a second valve mounted intermediate and in fluid communication with the first pressure chamber and the emergency air brake system, the firs valve being moveable between open and closed positions to control the flow of pressurized fluid from the emergency air brake system to the first pressure chamber, the movement of the second valve between the open and closed positions being responsive to the relative pressure supplied by the emergency air brake system to the second valve, wherein the first valve is in the open position when the emergency air brake system is supplying pressurized air thereby supplying pressurized fluid from the emergency air brake system to the first pressure chamber, and the first valve is closed when the pressure supplied by the emergency air bake system terminates.

8. The improved air spring assembly according to claim 2 wherein the support member comprises:

a base plate having a top end rotatably mounted to the top plate, a bottom end opposite the top end and a guide channel extending at least a portion of the distance between the top and bottom ends; and a guide member slidably mounted in the guide channel, the distal end of the piston rod being rotatably mounted to the guide member;

wherein the bottom end of the base plate is adjacent the top plate in the first position of the support member, the bottom end of the base plate is extended away from the top plate in the second position and the guide member slides in the guide channel in response to movement of the base plate between the first and second positions.

9. The improved air spring assembly according to claim 8 wherein the support member is U-shaped in cross section and comprises the base plate and a pair of opposed side plates.

10. The improved air spring assembly according to claim 9 and further comprising a bumper plate having an upper surface and mounted to the piston wherein the bottom end of the support member abuts the bumper plate upper surface in the second position of the support member when the air pressure inside the air spring is insufficient to support the downward force acting on the top plate.

11. An improved air spring assembly according to claim 10 and further comprising a retainer formed in the upper surface of the bumper plate, the retainer being dimensioned to receive and retain the bottom end of the base plate when the base plate is in the second position.

12. The improved air spring assembly according to claim 8 wherein the guide channel is T-shaped in cross section.

13. The improved air spring assembly according to claim 2 wherein the actuator further comprises a spring mounted inside a chamber in the air cylinder and adapted to bear upon the piston at the proximal end of the air cylinder to bias the piston rod and support member into of the first and second positions.

14. The improved air spring assembly according to claim 2 and further comprising a spring mounted between the top plate and the support member and adapted to bias the support member into one of the first and second positions.

15. The improved air spring assembly according to claim 1 wherein the support member comprises:

a base plate having a top end rotatably mounted to the top plate and a bottom end opposite the top end, the bottom end being adjacent the top plate in the first position and extended away from the top plate in the second position; and a pair of opposed side plates mounted to the base plate to form a support member which is U-shaped in cross section.

16. The improved air spring assembly according to claim 15 and further comprising an at least one shaft mounted to the top end of the base plate and at least one shaft support member mounted to the top plate to receive the at least one shaft, the at least one shaft and at least one shaft support member rotationally mounting the support member plate to the top plate for rotational movement between the first and second positions.

17. The improved air spring assembly according to claim 16 and further comprising a stop plate mounted to the top plate adjacent the top end of the base plate, the stop plate mounted to engage the top end of the base plate and prevent over-rotation of the base plate beyond the second position.

18. The improved air spring assembly according to claim 1 wherein the support member comprises an upper bumper member mounted to the top plate for rotational movement between the first and second positions and a lower bumper member mounted to the piston, wherein, the upper and lower bumper members are out of registry within the air spring in the first position and the upper and lower bumper members are aligned within the air spring in the second position to restrict movement of the piston relative to the top plate toward each other.

19. The improved air spring assembly according to claim 18 wherein the support member further comprises:

an axle shaft extending through the top plate, the axle shaft having a top end located outside of the air spring and a bottom end received inside the air spring;

a rotating disc having an outer perimeter, the disc being mounted to the bottom end of the axle shaft parallel to the top plate for rotational movement between first and second positions, the upper bumper member being mounted to the rotating disc; and a toothed pinion mounted to the top of the axle shaft; and the actuator comprises:

an air cylinder mounted to the top plate adapted to receive pressurized fluid from a suitable source; and an air cylinder piston rod mounted in the air cylinder for extension and retraction in response to the air pressure inside the cylinder, the air cylinder piston rod having a proximal end and a distal end, the proximal end being reciprocatably mounted within the air cylinder and the distal end having a toothed rack mounted thereon, the toothed rack interengaging the teeth of the pinion;

wherein extension of the air cylinder piston rod causes rotation of the pinion, the axle shaft, the rotating disc and the upper bumper member relative to the top plate.

20. The improved air spring assembly according to claim 19 wherein the flange member further comprises an annular groove formed therein wherein the groove accommodates fasteners to mount the top plate to the vehicle frame.

21. The improved air spring assembly according to claim 19 wherein the support member further comprises a flange member mounted to the top plate inside the air spring to surround the rotating disc, the flange member having a radially, inwardly extending flange to support the outer perimeter of the disc.

22. The improved air spring assembly according to claim 19 and further comprising a spring mounted inside the air cylinder between the air cylinder and the piston rod to bias the piston rod into the retracted position, the retracted position corresponding to the second position of the support member.

23. The improved air spring assembly according to claim 19 wherein the upper and lower bumper members comprise proximal and distal ends, the proximal ends of the upper and lower bumpers being mounted to the rotating disc and piston, respectively, the distal ends being spaced from the rotating disc and piston and the upper and lower bumpers being tapered such that the proximal end of each bumper is broader than the distal end of the bumper.

24. The improved air spring assembly according to claim 2 wherein the air cylinder piston rod further comprises a plurality of teeth formed along the length thereof and the support member further comprises a pinion gear mounted to mesh with the teeth of the piston rod, wherein movement of the piston rod along a longitudinal axis thereof is translated into rotational movement of the pinion gear and support member relative to the top plate.

* * * * *

UNITED STATES PATENT AND TRADEMARK OFFICE
CERTIFICATE OF CORRECTION

PATENT NO. : 5,921,532
DATED : July 13, 1999
INVENTOR(S) : Pierce et al.

It is certified that error appears in the above-identified patent and that said Letters Patent is hereby corrected as shown below:

Title page,
Item [75], Inventors should read -- Gregory T. Galazin, Montague; William J. Hicks, Muskegon, both of Michigan. --

Column 19,
Line 32, "fit" should read -- first --.

Column 20,
Line 28, "bake" should read -- brake --.

Column 21,
Line 2, "and further comprising a" should read -- wherein the biasing member further comprises a --

Column 22,
Lines 40-47, should read
-- 24. The improved air spring assembly according to claim 2 wherein the support member is rotatably mounted to the top plate for movement between the first and second positions, the air cylinder piston rod further comprises a plurality of teeth formed along the length thereof and the support member further comprises a rack mounted to mesh with the teeth of the piston rod, wherein movement of the piston rod along a longitudinal axis thereof is translated into rotational movement of the rack and support member relative of the top plate.

Signed and Sealed this

Thirtieth Day of April, 2002

*Attest:*

*Attesting Officer*

JAMES E. ROGAN
*Director of the United States Patent and Trademark Office*